US012648038B2

(12) United States Patent
Hong et al.

(10) Patent No.: US 12,648,038 B2
(45) Date of Patent: Jun. 2, 2026

(54) METHOD AND WIRELESS COMMUNICATION TERMINAL FOR TRANSMITTING/RECEIVING DATA IN WIRELESS COMMUNICATION SYSTEM

(71) Applicant: WILUS INSTITUTE OF STANDARDS AND TECHNOLOGY INC., Gyeonggi-do (KR)

(72) Inventors: Hanseul Hong, Gyeonggi-do (KR); Geonjung Ko, Gyeonggi-do (KR); Sanghyun Kim, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 193 days.

(21) Appl. No.: 18/228,641

(22) Filed: Jul. 31, 2023

(65) Prior Publication Data

US 2023/0389101 A1     Nov. 30, 2023

Related U.S. Application Data

(63) Continuation of application No. PCT/KR2022/001674, filed on Jan. 28, 2022.

(30) Foreign Application Priority Data

Jan. 29, 2021    (KR) ........................ 10-2021-0013703
Feb. 4, 2021    (KR) ........................ 10-2021-0015796

(51) Int. Cl.
*H04W 76/15*        (2018.01)
*H04W 48/14*        (2009.01)
(Continued)

(52) U.S. Cl.
CPC .......... *H04W 76/15* (2018.02); *H04W 48/14* (2013.01); *H04W 74/004* (2013.01); *H04W 84/12* (2013.01)

(58) Field of Classification Search
None
See application file for complete search history.

(56) References Cited

U.S. PATENT DOCUMENTS

| 11,202,286 B2 | 12/2021 | Huang et al. |
| 11,304,127 B2 | 4/2022 | Chu et al. |
| (Continued) | | |

FOREIGN PATENT DOCUMENTS

| KR | 10-2020-0091968 | 8/2020 |
| KR | 10-2021-0007881 | 1/2021 |
| (Continued) | | |

OTHER PUBLICATIONS

International Search Report for PCT/KR2022/001674 mailed on May 13, 2022 and its English translation from WIPO (now published as WO 2022/164290).

(Continued)

*Primary Examiner* — Hong S Cho
(74) *Attorney, Agent, or Firm* — WOMBLE BOND DICKINSON (US) LLP

(57) ABSTRACT

Disclosed is a method by which a station (STA) of a multi-link device (MLD) transmits frames in a wireless communication system. In the present invention, an MLD transmits, to an AP MLD including at least one access point (AP), a request message related to a channel access, and receives a response message in response to the request message.

16 Claims, 25 Drawing Sheets

(51) Int. Cl.
H04W 74/00 (2009.01)
H04W 84/12 (2009.01)

(56) References Cited

U.S. PATENT DOCUMENTS

| | | | |
|---|---|---|---|
| 11,445,431 B2 | 9/2022 | Patil et al. | |
| 12,267,900 B2 * | 4/2025 | Jang | H04W 76/11 |
| 2019/0335454 A1 * | 10/2019 | Huang | H04W 88/085 |
| 2020/0221545 A1 * | 7/2020 | Stacey | H04W 84/12 |
| 2021/0014911 A1 | 1/2021 | Patil et al. | |
| 2022/0132610 A1 | 4/2022 | Guo et al. | |
| 2022/0279375 A1 * | 9/2022 | Kim | H04W 28/0263 |

FOREIGN PATENT DOCUMENTS

| | | |
|---|---|---|
| KR | 10-2021-0007896 | 1/2021 |
| WO | 2021/011476 | 1/2021 |
| WO | 2021/262092 | 12/2021 |
| WO | 2022/164290 | 8/2022 |

OTHER PUBLICATIONS

Written Opinion of the International Searching Authority for PCT/KR2022/001674 mailed on May 13, 2022 and its English translation from WIPO (now published as WO 2022/164299).

Jang, Insun (LG Electronics) et al.: "Usage and Rules of ML element in the context of Multi-link Setup", doc.: IEEE 802.11-15/xxxr0, Jan. 12, 2021, pp. 1-2.

LAN/MAN Standards Committee of IEEE Computer Society: "Draft Standard for Information technology _ Telecommunications and information exchange between systems Local and metropolitan area networks _ Specific requirements Part 11: Wireless LAN Medium Access Control (MAC) and Physical Layer (PHY) Specifications Amendment 8: Enhancements for extremely high throughput (EHT)", IEEE P802.11be™M/D0.3, Jan. 3, 2021, pp. 1-389.

Laurent Cariou: "MLO discovery: Discovery procedures (inclusion probing) and RNR", doc.: IEEE 802.11-18/0149r05, Aug. 20, 2020, pp. 1-6.

Office Action (1st) dated May 16, 2025 for Indian Patent Application No. 202327051621 and its English translation.

Insun Jang et al.: "Usage and Rules of ML element in the context of Multi-link Setup", doc.: IEEE 802.11-20/1300r, Dec. 1, 2021, pp. 1-3.

Office Action (1st) dated Aug. 14, 2025 for Vietnamese Patent Application No. 1-2023-05768 and its English translation provided by Applicant's foreign counsel.

Hearing Notice dated Dec. 16, 2025 for Indian Patent Application No. 202327051621 and its English translation.

* cited by examiner

User Interface Unit

140

Display Unit

150

Memory

160

Processor

Communication Unit (a) 11a/g PPDU (b) 11ax HE PPDU (c) 11be EHT PPDU (d) L-SIG RL-SIG (e) U-SIG (f) MU PPDU Format-specific bits (a) EHT SU PPDU (b) EHT TB PPDU (c) EHT MU PPDU (d) EHT ER SU PPDU (a)

METHOD AND WIRELESS COMMUNICATION TERMINAL FOR TRANSMITTING/RECEIVING DATA IN WIRELESS COMMUNICATION SYSTEM

CROSS-REFERENCE TO RELATED APPLICATIONS

This application is a continuation of International Patent Application No. PCT/KR2022/001674 filed on Jan. 28, 2022, which claims the priority to Korean Patent Application No. 10-2021-0013703 filed in the Korean Intellectual Property Office on Jan. 29, 2021, and Korean Patent Application No. 10-2021-0015796 filed in the Korean Intellectual Property Office on Feb. 4, 2021, the entire contents of which are incorporated herein by reference.

TECHNICAL FIELD

The present invention relates to a wireless communication system and, more specifically, to a structure of a radio frame, a decoding method, and a wireless communication terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band. IEEE 802.11be has proposed technologies including a 30 MHz bandwidth, a multi-link operation, a multi-access point (multi-AP) operation, and a retransmission operation (hybrid automatic repeat request HARQ), etc.

A multi-link operation may be performed in various types according to the operation scheme and implementation method thereof. However, this operation may face a problem that has not occurred in a conventional IEEE 802.11-based wireless LAN communication operation, and thus a definition for a detailed operation method of a multi-link operation is needed.

Meanwhile, this background section is written for improving understanding of the background of the disclosure, and may include contents other than a prior art already known to a person skilled in the art.

DISCLOSURE OF INVENTION

Technical Problem

The present invention is to provide a method for determining a structure of a frame transmitted or received by a multi-link device including one or more stations, and a method for interpreting a field of a received frame, in a multi-link operation.

In addition, the present invention is to provide a method for including a field indicating a MAC address of another STA included in an MLD according to the type of a received frame.

In addition, the present invention is to provide a method for interpreting a received frame according to the type of an STA.

The technical problems to be solved in the present invention are not limited to the above-mentioned technical problems, and other unmentioned technical problems can be clearly understood by those skilled in the art to which the present invention belongs from the description below.

Solution to Problem

A station (STA) of a multi-link device (MLD) of a wireless communication system may include a transceiver and a processor, wherein the processor is configured to: transmit a request message related to channel access to an access point (AP) MLD including at least one AP, the request message including a multi-link element including a type subfield indicating the type of the multi-link device; and receive a response message as a response to the request message, and the multi-link element further includes, according to the type indicated by the type subfield, an STA MAC address subfield including a MAC address of each of the at least one station for identifying the at least one station and an MLD MAC address subfield for identifying the MLD.

In addition, in the present invention, when the type subfield indicates that the type of the multi-link element is basic, the multi-link element may include the STA MAC address subfield.

In addition, in the present invention, when the type subfield does not indicate that the type of the multi-link element is basic, the multi-link element may not include the STA MAC address subfield.

In addition, in the present invention, the request message is an association request message for requesting the channel access, the response message may be an association response message corresponding to a response to the association request message, and the multi-link element of the association request message may include the STA MAC address subfield.

In addition, in the present invention, the association response message may include the STA MAC address subfield at a position identical to that of the association request message.

In addition, in the present invention, the response message includes neighbor AP information corresponding to information on an AP other than an AP having transmitted the response message, among one or more APs included in the AP MLD, and bytes after a specific byte of the neighbor AP information are not decoded according to the type of the STA.

In addition, in the present invention, when the STA is an EHT STA, bytes after the specific byte may be decoded, and when the STA is not the EHT STA, bytes after the specific byte may not be decoded.

In addition, in the present invention, the specific byte may be a $13^{th}$ byte.

In addition, in the present invention, the neighbor AP information may further include a length field indicating a length of the neighbor AP information, and at least one field included in the neighbor AP information may be identified on the basis of a value of the length field.

In addition, the present invention may provide a method including: transmitting a request message related to channel access to an access point (AP) MLD including at least one AP, wherein the multi-link device includes at least one station, and the request message includes a multi-link element including a type subfield indicating the type of the multi-link device; and receiving a response message as a response to the request message, wherein the multi-link element further includes, according to the type indicated by the type subfield, an STA MAC address subfield for identifying the at least one station and an MLD MAC address subfield for identifying the MLD.

Advantageous Effects of Invention

According to an embodiment of the present invention, a structure of a frame transmitted or received by a multi-link device including two or more stations, and a method for interpreting a field of a received frame.

In addition, the present invention may include a field indicating a MAC address of another STA included in an MLD according to the type of a received frame, and thus a format of a frame can be efficiently configured.

In addition, the present invention may provide a method for differently interpreting a received frame according to the type of a terminal, and thus backward compatibility of a legacy terminal can be increased.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 2 illustrates a wireless LAN system according to another embodiment of the present invention.

FIG. 3 illustrates a configuration of a station according to an embodiment of the present invention.

FIG. 22 illustrates a structure of a multi-link information element included in a multi-link association response frame and transmitted by an AP MLD according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively. Hereinafter, in the present invention, a field and a subfield may be interchangeably used.

Figure 1:
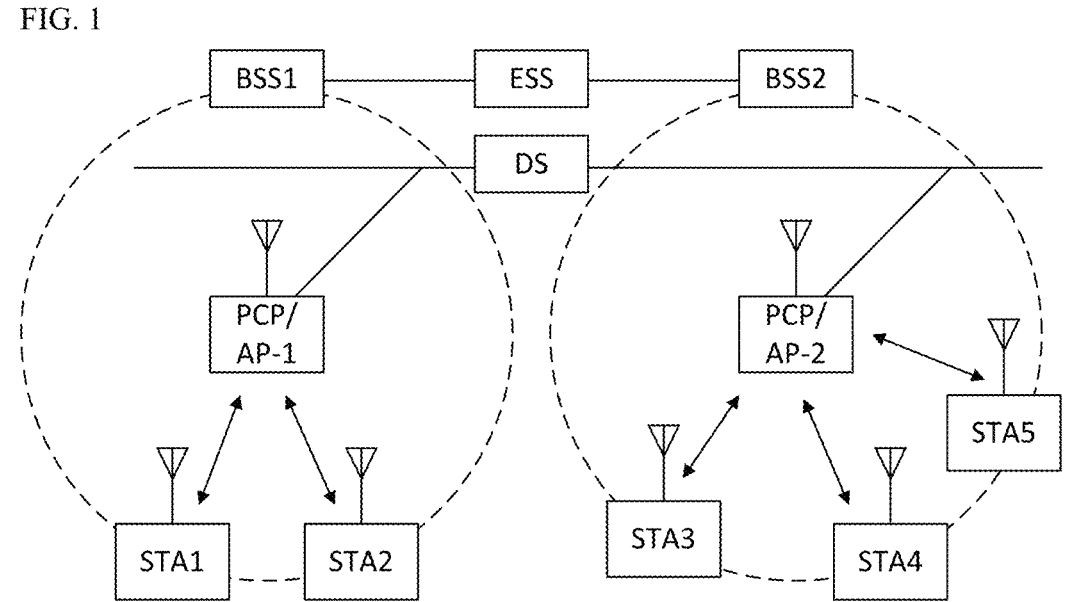
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
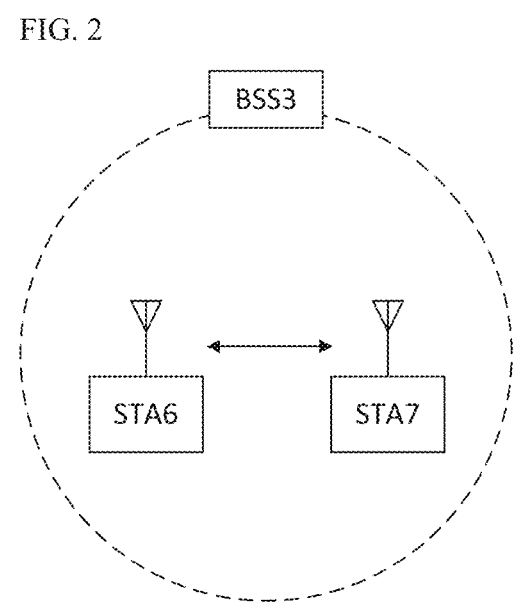

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
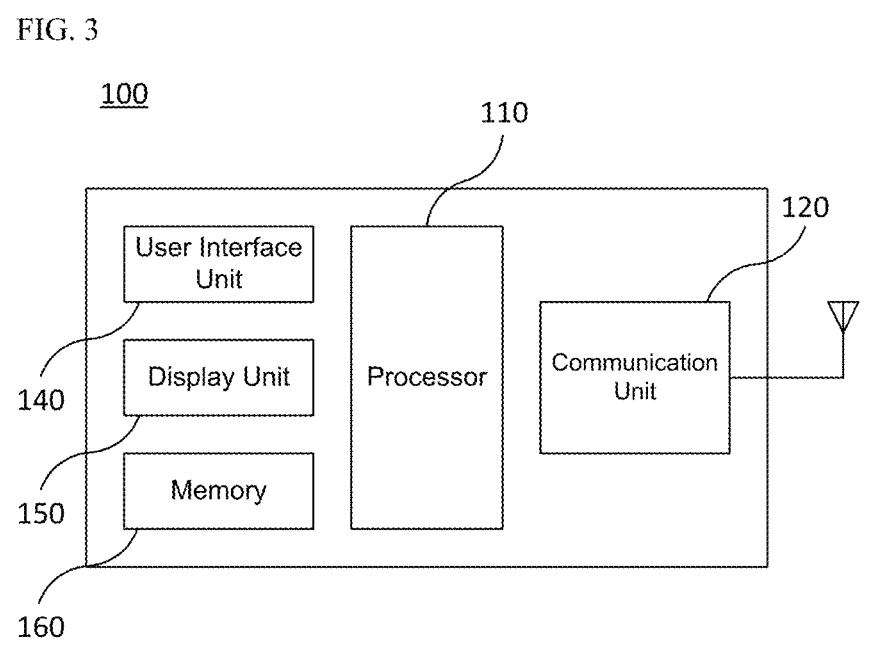

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
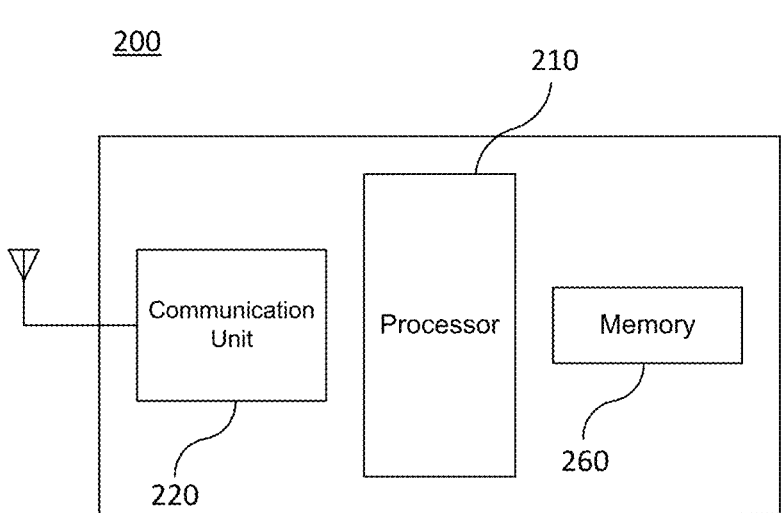
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
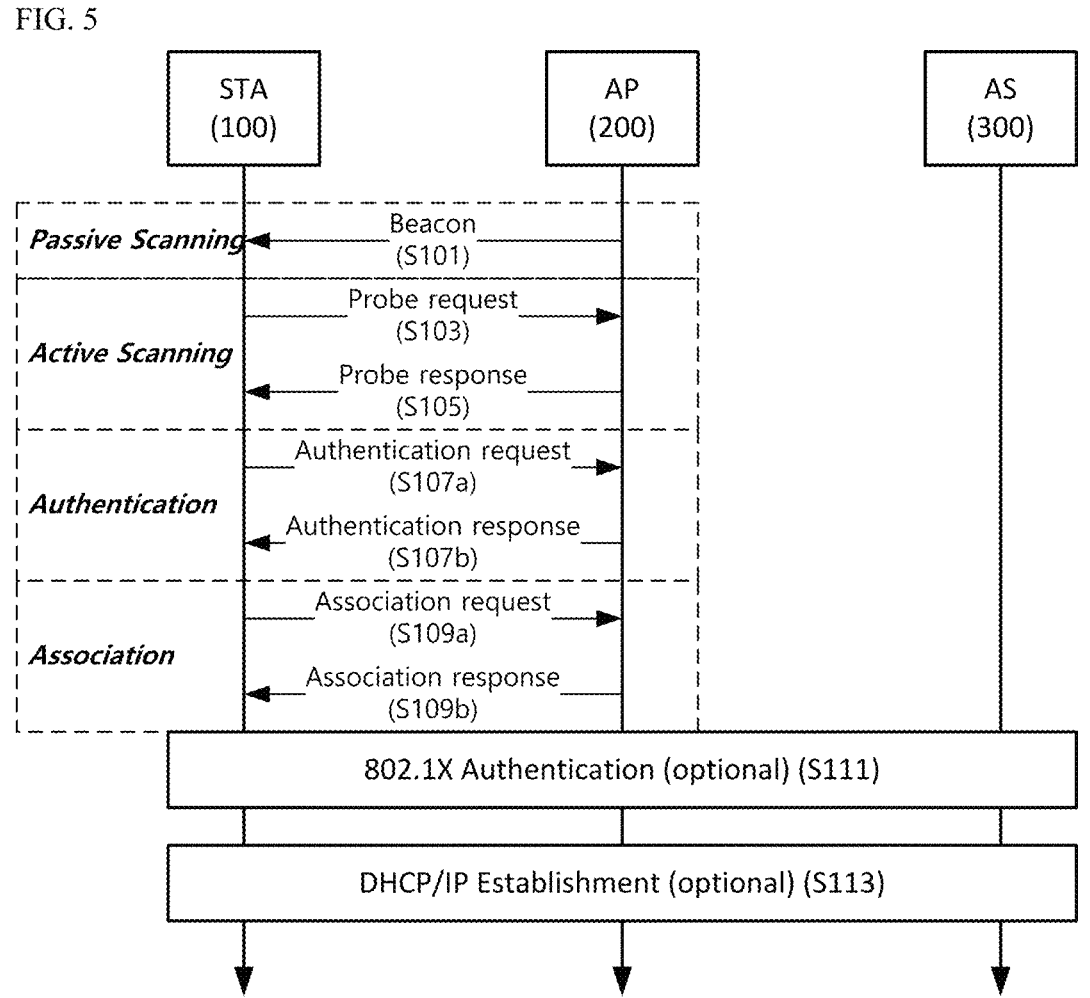
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
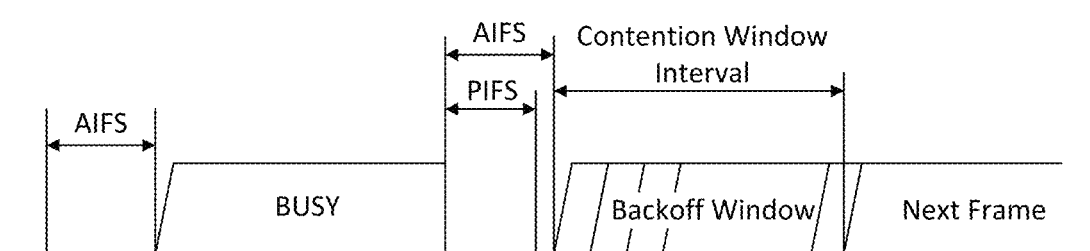
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, a terminal of the present disclosure is referred to as a non-AP STA, an AP STA, an AP, a STA, a receiving device or a transmitting device, but the present disclosure is not limited thereto. In addition, the AP STA of the present disclosure may be referred to as the AP.

Examples of Various PPDU Formats

Figure 7:
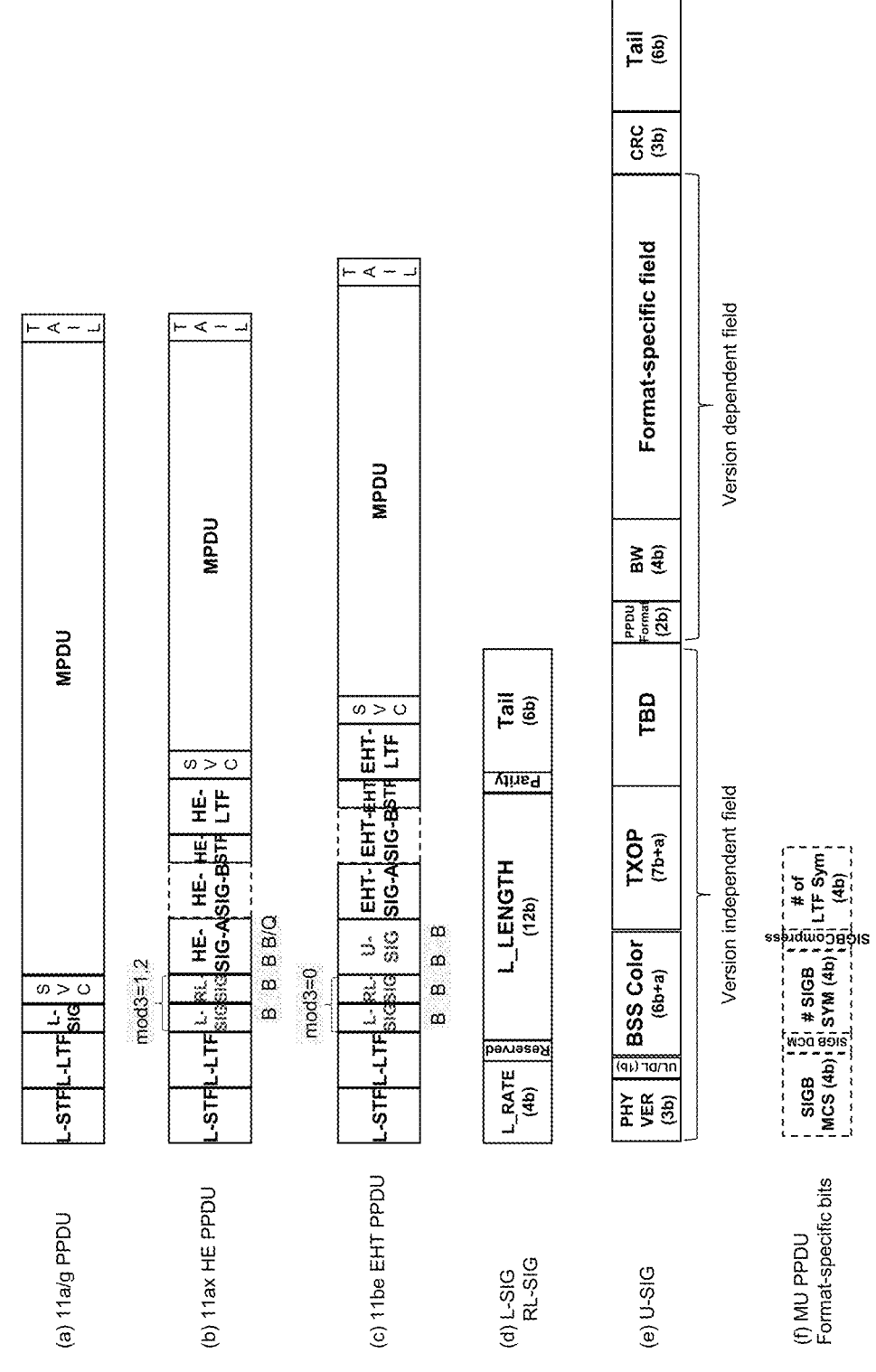
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(*d*) illustrates detailed field configurations of RL-SIG and L-SIG commonly used in the PPDU formats.

Referring to FIG. 7(*a*), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(*b*), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(*c*), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(*d*) illustrates a 24-bit information configuration of L-SIG.

Referring to FIG. 7(*d*), the L-SIG includes an L RATE field and an L_LENGTH field. The L RATE field includes 4 bits and indicates an MCS used for data transmission. Specifically, the L RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L RATE field and information of the L_LENGTH field. In a non-legacy PPDU format, the L RATE field is configured to a minimum rate of 6 Mbps.

A unit of the L_LENGTH field is a byte and a total of 12 bits are allocated to signal up to 4095, and a length of the PPDU may be indicated in combination with the L RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration and then adding 20 us which is consumed to transmit the L-STF, the L-LTF, and the L-SIG, the length of a corresponding PPDU, i.e., a receipt time (RX-TIME) is acquired, which is expressed by Equation 1 below.

$$RXTIME(us) = \left( \left\lceil \frac{L\_LENGTH + 3}{3} \right\rceil \right) \times 4 + 20 \qquad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left( \left\lceil \frac{TXTIME - 20}{4} \right\rceil \right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$TXTIME(us) = T_{L\text{-}STF} + T_{L\text{-}LTF} + T_{L\text{-}SIG} + T_{RL\text{-}SIG} + T_{U\text{-}SIG} +$$
$$(T_{ENT\text{-}SIG\text{-}A}) + (T_{ENT\text{-}SIG\text{-}B}) + T_{EHT\text{-}STF} +$$
$$N_{EHT\text{-}LTF} \cdot T_{EHT\text{-}LTF} + T_{DATA} \qquad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(*e*), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
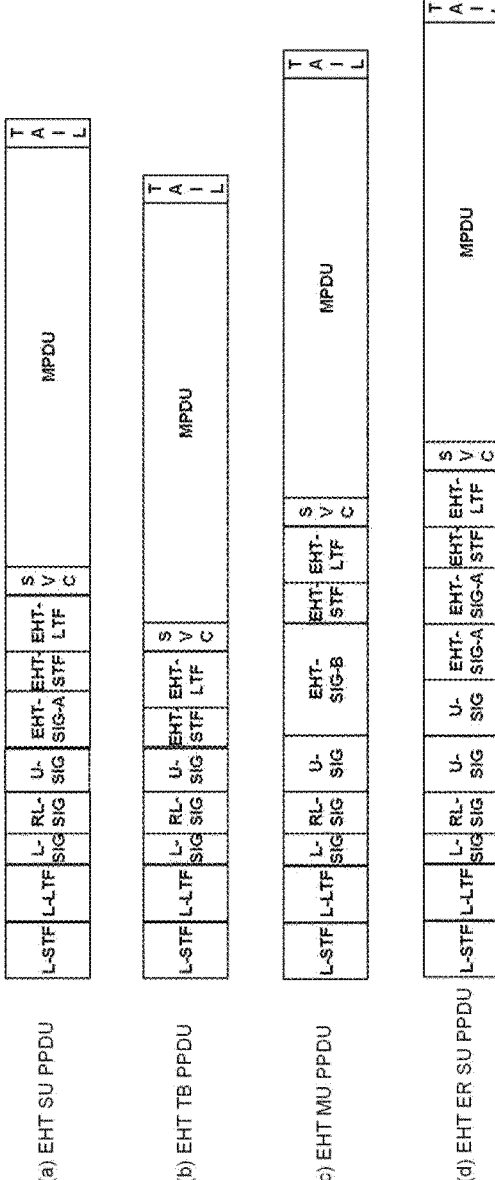
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(*a*) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(*b*) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, the EHT SU PPDU and the EHT MU PPDU may be indicated by the same value through the U-SIG PPDU format subfield. At this time, the EHT SU PPDU and the EHT MU PPDU may be divided by the number of the STAs receiving the PPDU. For example, the PPDU receiving one STA may be identified as the EHT SU PPDU, and when the number of the STAs is configured to receive two or more STAs, the PPDU may be identified as the EHT MU PPDU. In other words, two or more PPDU formats illustrated in FIG. 8 may be indicated through the same subfield value.

In addition, a part field among the fields illustrated in FIG. 8 or part information of the field may be omitted, and the case that the part field or the part information of the field is omitted may be defined as a compression mode or a compressed mode.

Figure 9:
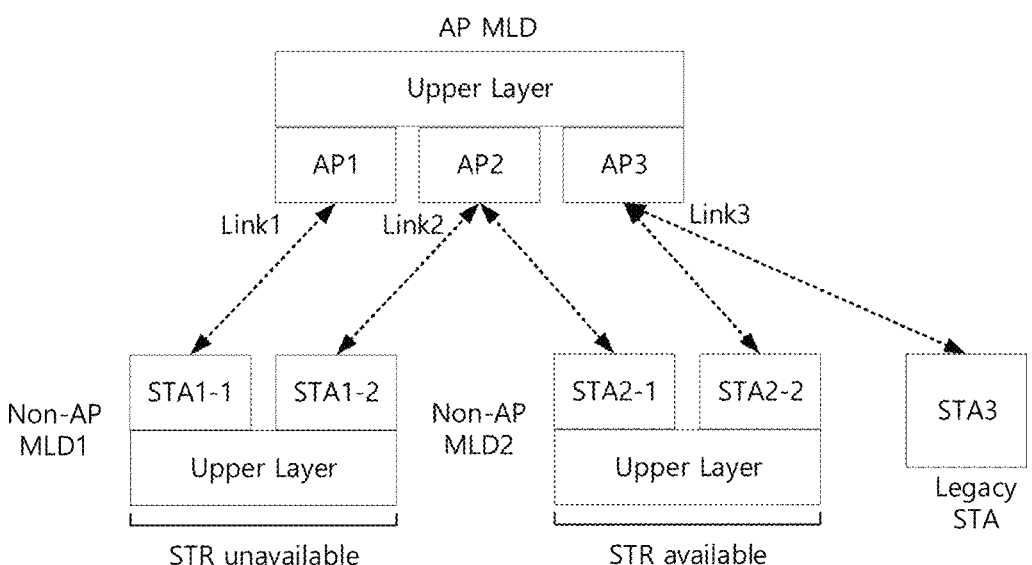
FIG. 9 is a concept diagram illustrating an example of structures of an AP MLD and an STA MLD performing a multi-link operation according to an embodiment of the present invention.

FIG. 9 is a concept diagram illustrating an example of structures of an AP MLD and an STA MLD performing a multi-link operation according to an embodiment of the present invention.

Referring to FIG. 9, a multi-link device (MLD) may be referred to as an MLD, and means a logical entity. The MLD may include one or more STAs, and has a single medium access control service access point (MAC SAP) for a logical link control (LLC) including one MAC data service. The MLD may be divided into an AP MLD and an STA MLD according to the roles thereof.

An AP multi-link device (MLD) may include one or more radio access points (APs), and may be a device connected to an upper layer through one interface. That is, the AP MLD may be connected to a logical link control (LLC) layer through one interface. Several APs included in the AP MLD may share some functions in a MAC layer, and the respective APs may operate in different links, respectively. The STA MLD may include one or more non-AP STAs, and may be a device connected to an upper layer through one interface. That is, the STA MLD may be connected to an LLC layer through one interface, and several STAs included in the STA MLD may share some functions in a MAC layer. In addition, the STA MLD may be referred to as a non-AP MLD. In this case, the AP MLD and the STA MLD may perform a multi-link operation performing communication using multiple individual links. That is, when an AP MLD includes several APs, each of the AP may configure a separate link to perform a frame transmission or reception operation with each of terminals included in the STA MLD by using multiple links. In this case, each of links may operate in 2.4 GHz, 5 GHz, or 6 GHz band, and each of the links may perform a bandwidth extension operation. For example, when the AP MLD configures one link in the 2.4 GHz band and two links in the 5 GHz band, frame transmission may be performed at a bandwidth of 40 MHz through a bandwidth extension scheme, and frame transmission may be performed at a bandwidth of a maximum of 320 MHz in each of the links using the 5 GHz band, by utilizing a non-consecutive bandwidth.

In the AP MLD or the STA MLD, while one terminal in an MLD performs a transmission operation, another terminal may fail to perform a reception operation due to an interference problem in a device. An operation of performing reception, while one AP or terminal in an MLD performs a transmission operation, by another AP or terminal in the MLD is called simultaneous transmission and reception (STR). The MLD may perform an STR operation for all links. Alternatively, the AP MLD may fail to perform an STR operation in some links. A terminal MLD which can perform the STR operation may be connected to the AP MLD, and an MLD which cannot perform the STR operation for some or all links may be connected to the AP MLD. In addition, a terminal (for example, IEEE 802.11a/b/g/n/ac/ax terminal) not belonging to the MLD may be additionally connected to an AP included in the AP MLD.

Figure 10:
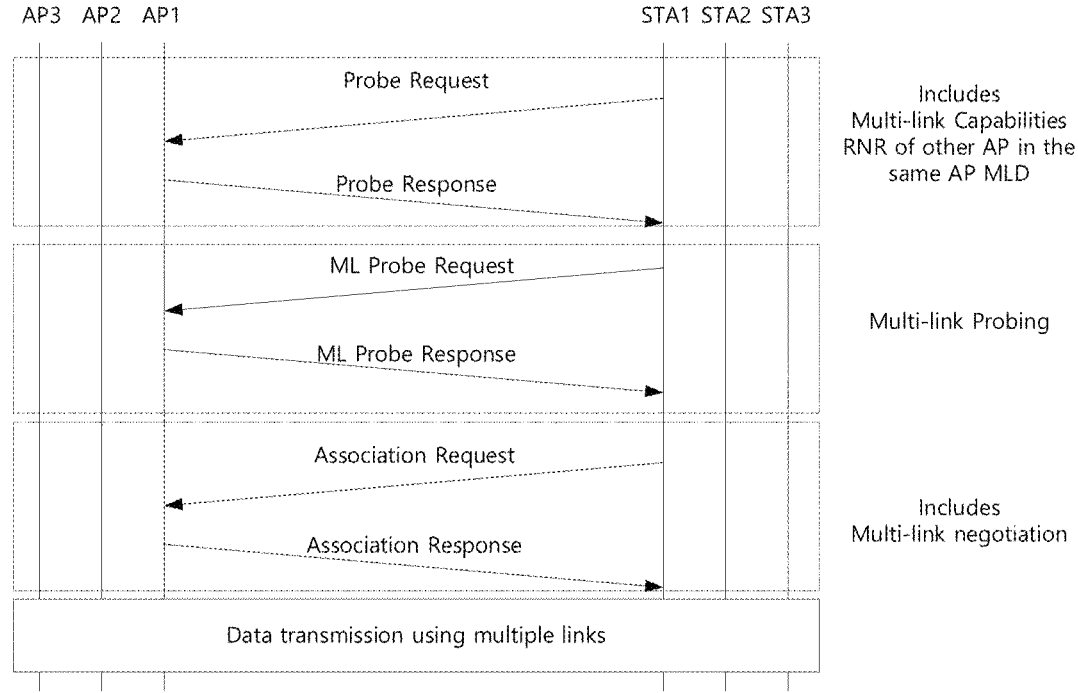
FIG. 10 is a flow chart illustrating an example of an association process and a negotiation process between an AP MLD and an STA MLD for performing a multi-link operation according to an embodiment of the present invention.

FIG. 10 is a flow chart illustrating an example of an association process and a negotiation process between an AP MLD and an STA MLD for performing a multi-link operation according to an embodiment of the present invention. A redundant description of the association process, made in FIG. 5, is omitted in FIG. 10.

Referring to FIG. 10, an AP MLD and an STA MLD may perform a negotiation process for using a multi-link use operation in a scanning and association process. For example, in the scanning process described in FIG. 5, an AP included in the AP MLD may include, in a beacon frame, an indicator indicating that a multi-link operation is available, the number of available links, information on multiple APs operating links, respectively, in the AP MLD, and the like, and transmit the same. In this case, for another AP in the same AP MLD, other than an AP transmitting the corresponding beacon frame, only some pieces of information may be included in the beacon frame and transmitted. Information on other AP included in the same AP MLD as the AP for transmitting the beacon frame may be transmitted in the form of a reduced neighbor report (RNR) information element. The RNR information element may include one or more of a link ID of a link operated by a corresponding AP among information for an AP included in the corresponding information element, a channel and operation class, and a counter indicating an update status for a parameter used by the corresponding AP.

A terminal belonging to the STA MLD may receive the beacon frame to identify that the AP for transmitting the corresponding beacon frame belongs to the AP MLD. In addition, the terminal may identify some pieces of information (for example, a link ID, use channel information, a parameter update counter in the corresponding AP, etc.) relating to another AP belonging to the corresponding AP MLD. Alternatively, an STA belonging to the STA MLD may include, in a probe request frame, an indicator indicating that a multi-link operation is available, and transmit the same. As a response to the probe request frame, the AP belonging to the AP MLD may transmit a probe response frame. In this case, the AP may include, in the probe response frame, an indicator indicating that the multi-link operation is available. In this case, the AP may additionally include the number of links available during the multi-link operation, link information, etc., and transmit the same. In addition, the AP may additionally transmit some pieces of information relating to another AP belonging to the same AP MLD. In this case, some pieces of information relating to another AP may be transmitted in the form of the above-described RNR information element.

The STA having identified that the AP corresponds to an AP belonging to the AP MLD through the beacon frame or the probe response frame may transmit a multi-link probe request frame for requesting all information relating to another AP belonging to the corresponding AP MLD to the AP to perform a multi-link operation. The multi-link probe request frame may indicate necessary information relating to the AP, which the corresponding STA MLD is to receive from the AP MLD. In this case, the necessary information may include one or more of an HT capability element, an HT operation element, a VHT capability element, a VHT operation element, a HE capability element, a HE operation element, an EHT capability element, an EHT operation element, a time point at which a beacon is transmitted (target beacon transmission time (TBTT)), EDCA parameter configuration information, information on a channel in which the corresponding AP operates, and information on a bandwidth supported by the corresponding AP. The STA MLD may request information on one or more specific APs in the multi-link probe request frame. Alternatively, the STA MLD may request information on all APs operated by the corresponding AP MLD. Alternatively, the STA MLD may request information on some of APs operated by the corresponding AP MLD. An ID for another AP, etc., which are requested, may be transferred in the form of a multi-link information element.

The AP MLD may receive a multi-link probe request frame from the STA MLD, and identify that the STA MLD requests some or all among information elements related to the corresponding AP operation, for some or all of the APs belonging to the corresponding AP MLD. The AP MLD having identified the request information may include the information requested by the STA MLD, and transmit the same to the corresponding STA MLD in the form of the multi-link probe response frame. In this case, information overlapping with information used by the AP for transmitting the corresponding multi-link probe response frame may be omitted and the rest of the information may be transmitted. The multi-link probe response frame includes more information than the probe response frame in FIG. 5, and thus during transmission of the corresponding multi-link probe response frame, a channel can be occupied for a longer time. Accordingly, to prevent a problem that a channel occupancy phenomenon excessively occurs due to transmission of excessive multi-link probe response frames, when a multi-link probe response frame is already transmitted to a specific STA MLD, a response to a multi-link probe request frame received from the same STA MLD may not be transmitted. The AP MLD may transmit a multi-link probe response frame including information of all APs belonging to the corresponding AP MLD in the form of a broadcast frame. The multi-link probe response frame transmitted in the form of the corresponding broadcast frame may be transmitted by a specific period or more. In this case, when the multi-link probe response frame has been transmitted in the form of a broadcast frame within a specific time before reception of the multi-link probe request frame from the STA MLD, transmission of the multi-link probe response frame may not be performed. In this case, the specific time may be after a time point at which the STA belonging to the corresponding STA MLD transmits the probe request frame of FIG. 5.

The STA MLD having received the multi-link probe response frame from the AP MLD may identify an operation parameter, etc. in each AP belonging to the AP MLD, and may perform an association process and a negotiation process with the AP MLD. In this case, the negotiation process for the multi-link operation may be performed in the association process between APs belonging to the AP MLD and terminals belonging to the STA MLD. That is, a random terminal (for example, STA 1) belonging to the STA MLD may transmit, while transmitting an association request frame to a random AP (for example, AP 1) belonging to the AP MLD, an indicator indicating that the multi-link operation of the terminal is available, and a request indicator requesting to perform the multi-link operation. In this case, the STA MLD may include, in the association request frame, information on a link to be used by the AP MLD and information on a capability of a terminal related to the corresponding link (for example, information indicating whether STR with another link is possible, a maximum transmission bandwidth, the maximum number of available spatial streams, etc.), and transmit the same. The AP having received the association request frame from the terminal may identify the indicator requesting the multi-link operation, and when the multi-link operation is possible, the AP may include, in an association response frame which allows the multi-link operation, information on a link to be used for the multi-link operation, a parameter used in each link, etc., and transmit the same to the corresponding terminal. The parameter for the multi-link operation may include one or more of a link ID of each used link, a MAC address, a band, a bandwidth extension direction, a target beacon transmission time (TBTT), and whether an STR operation is possible. In this case, when the STA MLD indicates that the STR operation is impossible, the AP MLD may additionally indicate a threshold value for performing channel sensing while the STA MLD performs a medium sync delay operation for the coarsening link. The AP MLD and the STA MLD having identified the use of the multi-link operation through exchange of the association request frame and response frame may perform a frame transmission operation using multiple links, by using several APs included in the AP MLD and several terminals included in the STA MLD after the corresponding association process.

The AP MLD and the STA MLD having completed the negotiation for the multi-link operation may perform frame transmission or reception operation utilizing multiple links. When the AP MLD and the STA MLD can perform an STR operation in a link used when performing the multi-link operation, APs or terminals belonging to the AP MLD or the STA MLD independently perform a channel contention procedure for frame transmission in the respective links. In this case, a transmission start time point and a transmission end time of a transmitted frame may vary in each link. When the independent transmission scheme is performed, a transmission opportunity (TXOP) acquired through the channel contention process in each link may be independently acquired in each link.

When a scheme of independently performing a channel access procedure in each link is performed, an operation is performed according to a channel state in each link, and thus the operation for the link can be more efficiently performed. In this case, an STR operation may not be possible in the AP MLD and the STA MLD for a corresponding link since an interval between operation bands of the respective APs operated by the AP MLD is not sufficiently wide. When the STR operation is impossible, the STA MLD or the AP MLD may additionally perform an operation matching frame transmission start time points or frame transmission end time points of a frame transmitted in each link. The frame transmission start time point and the frame transmission end time point may be referred to as a transmission start time point of a PPDU including the corresponding frame and a transmission end time point of a PPDU including the corresponding frame.

Each STA in the STA MLD is an STA performing an operation of IEEE 802.11be, and may thus perform an association operation with an AP not corresponding to the AP MLD. That is, the AP may be an AP (for example, IEEE 802.11a/b/g/n/ac/ax AP) not belonging to an MLD. Accordingly, an association operation performed by the STA MLD may be divided as follows.

Figure 11:
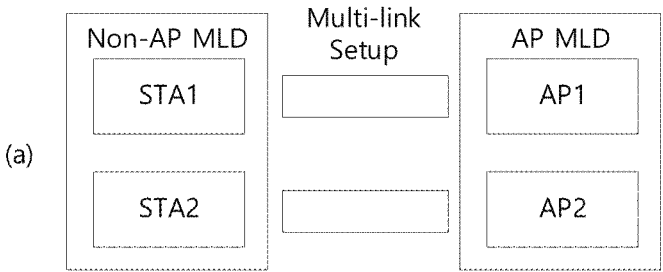
FIG. 11 is a concept diagram illustrating several types of association processes performed with an AP MLD or an AP by an STA MLD or an STA according to an embodiment of the present invention.
Figure 11:
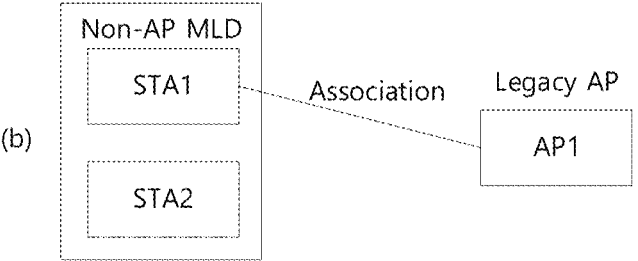
Figure 11:
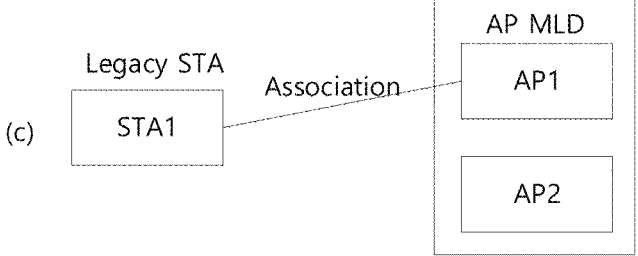

FIG. 11 is a concept diagram illustrating several types of association processes performed with an AP MLD or an AP by an STA MLD or an STA according to an embodiment of the present invention.

Referring to FIG. 11, an AP MLD and a non-AP MLD (or an STA MLD) may establish a multi-setup for each other, or may be combined with a legacy AP or a legacy non-AP STA.

Specifically, the STA MLD may perform an association operation with an AP, or may perform an association operation with an AP not corresponding to an AP MLD. Alternatively, an STA not belonging to the STA MLD may perform an association operation with the AP MLD. For example, as shown in FIG. 11(a), the STA MLD may perform an association operation for multi-link setup with the AP MLD. That is, the STA MLD may perform an association operation for setting up an individual link between at least one STA included in the STA MLD and at least one AP included in the AP MLD. In this case, the association operation may be a negotiation process for the multi-link setup. The association operation may be performed by a random STA belonging to the STA MLD. For example, when STA 1 and STA 2 belong to an STA MLD and AP 1 and AP 2 belong to an AP MLD, an association request frame and an association response frame may be exchanged between STA 1 and AP 1. Alternatively, an association request frame and an association response frame may be exchanged between STA 2 and AP 2. The association operation between the AP MLD and the STA MLD may be performed as illustrated in FIG. 11.

In another example, as illustrated in FIG. 11(b), the STA MLD and the AP not belonging to the AP MLD may perform the association operation in the scheme described in FIG. 5. In this case, one of the STAs belonging to the STA MLD may perform the association operation with the AP. In another example, as illustrated in FIG. 11(c), the AP MLD may perform the association operation with an STA not belonging to the STA MLD. In this case, the association operation may be performed as described in FIG. 5. Accordingly, one of the APs belonging to the AP MLD may perform an association operation and a frame exchange operation with the corresponding STA.

An operation in which two or more APs are associated with one STA, or an operation in which two or more AP MLDs are associated with one STA MLD may not be allowed. This is for clarifying, when data transferred from the network is transferred to an STA or an STA MLD, an AP or an AP MLD through which the data needs to be transferred.

When the STA MLD is associated with the AP not belonging to the AP MLD and more than one AP are associated with the STA MLD, the association between the STA MLD and the AP may be established in the following form.

Figure 12:
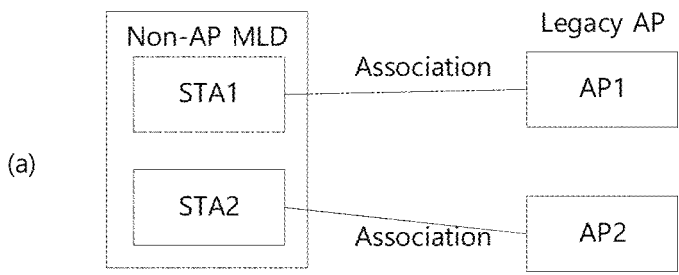
FIG. 12 illustrates an association state when an STA MLD performs an association operation two or more times with an AP not belonging to an AP MLD according to an embodiment of the present invention.
Figure 12:
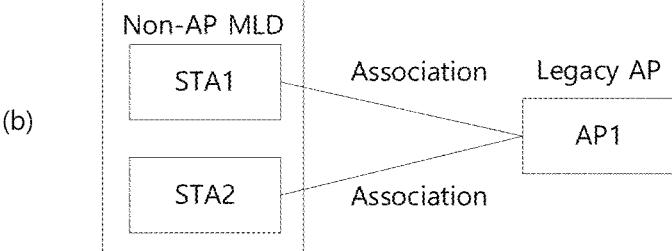

FIG. 12 illustrates an association state when an STA MLD performs an association operation two or more times with an AP not belonging to an AP MLD according to an embodiment of the present invention.

Referring to FIG. 12, a non-AP STA MLD may be associated with multiple APs (or legacy APs) or one AP not belonging to an AP MLD.

Specifically, when one STA MLD allows an operation of association with two or more APs, one STA MLD may be associated with two or more other APs as illustrates in FIG. 12(a). In this case, two or more APs may be APs not belonging to the AP MLD. As described in FIG. 9, the STA MLD may be connected to an LLC layer through one interface. In this case, as described above, one data stream may be transferred to two or more other APs. In addition, when data is transferred to an LLC layer or higher including the corresponding STA MLD in the network, an AP through which the data is to be transferred may be unclear.

When one STA MLD allows an operation of association with two or more APs, as illustrated in FIG. 12(*b*), the respective STAs included in the corresponding STA MLD may perform the association operation with the same AP. For example, when STA 1 and STA 2 belong to the STA MLD, STA 1 and STA 2 may perform an association operation separately from one AP. In this case, each association operation may be performed as shown in FIG. 5. Since a MAC address of each STA for transmitting the association request frame varies, and thus the corresponding AP may recognize the STA as a different STA and transmit an association response frame for accepting the corresponding association request. In this case, a device connected one LLC layer may operate like operating multiple STAs. Accordingly, when a channel assess operation is performed separately, an operation having more channel access opportunities than another device may be performed.

The operation of operating multiple independent STAs by one device may cause an issue of fairness. Accordingly, to disallow the corresponding operation, one STA MLD may be allowed to perform an association operation with only one AP or one AP MLD. To perform association with only one AP by the STA MLD, the STA MLD may perform the operation through the method described below.

Figure 13:
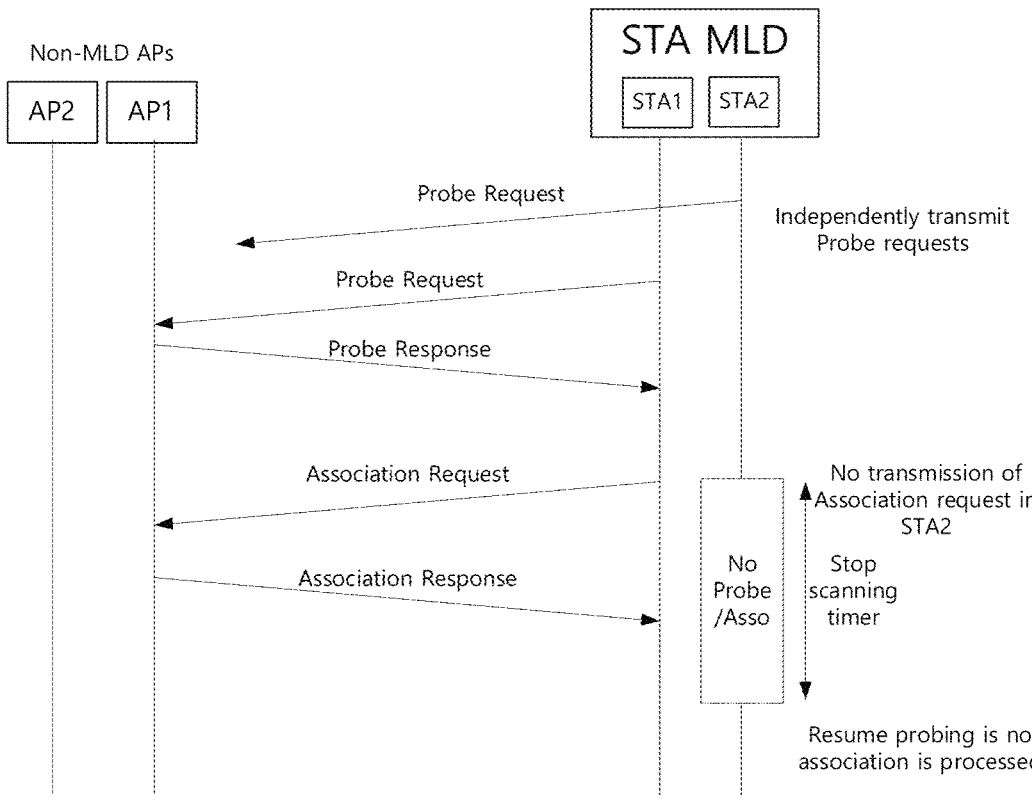
FIG. 13 is a flow chart illustrating an association process causing an STA MLD not to perform more than one association operation according to an embodiment of the present invention.

FIG. 13 is a flow chart illustrating an association process causing an STA MLD not to perform more than one association operation according to an embodiment of the present invention.

Referring to FIG. 13, when an STA transmits an association request frame for association, STAs belonging to the same STA MLD may fail to transmit the association request message for association to the same AP for a predetermined time.

Specifically, the respective STAs of the STA MLD may individually perform an association operation with an AP, but when an association request frame is transmitted to an STA of the corresponding STA MLD, a timer may operate for a specific time from a transmission end time point of the corresponding frame. In this case, while the corresponding timer operates, another STA of the corresponding MLD may fail to transmit a probe request frame or an association request frame. For example, STA 1 and STA 2 may belong to an STA MLD and may operate in different channels, respectively. STA 1 and STA 2 may independently operate a scanning operation, and receive a beacon frame transmitted by an AP in each of the channels. Alternatively, STA 1 and STA 2 may independently perform an operation of transmitting a probe request frame in the corresponding channel and receiving a probe response frame from an AP operating in the corresponding channel. Each of STA 1 and STA 2 may perform the scanning operation described in FIG. 5. In this case, the AP may be an AP not belonging to the MLD. For example, STA 1 may transmit a probe request frame in a channel in which AP 1 operates. AP 1 may receive the probe request frame transmitted by STA 1, and transmit a probe response frame as a response to the corresponding frame. STA 1 having received the probe response frame may identify that the AP exists in the corresponding channel. STA 1 may perform an association process with AP 1 on the basis of the probe response frame received from AP 1. The association process between STA 1 and AP 1 may be identical or similar to the association process described in FIG. 5. In addition, while performing the corresponding operation, STA 2 may perform the scanning operation in a channel in which the corresponding STA operates. For example, STA 2 may receive a beacon frame transmitted by AP 2. Alternatively, STA 2 may transmit a probe request frame to search for AP 2.

From a time point of starting the association process in STA 1, a timer for causing another STA not to transmit the association request frame for a specific time may operate in the corresponding MLD. That is, while the corresponding timer operates, another STA belonging to the same MLD may not be allowed to transmit the association request frame. Additionally, while the timer operates, another STA belonging to the same MLD may not be allowed to transmit the probe request frame. That is, for association with AP 1, when STA 1 transmits a probe request frame and/or an association request frame, STA 1 may operate a specific timer after transmitting the corresponding frame. STA 2 belongs to the same STA MLD as STA 1, and thus when the corresponding frame is transmitted by STA 1 and the specific timer operates, STA 2 cannot transmit, to the AP, the probe request frame and/or the transmission request frame for association until the specific timer expires.

The timer may be released when the corresponding timer expires or an association response frame is received as a response to the association request frame. In this case, when the association response frame indicates acceptance of the association request, the corresponding function may be deactivated for another STA belonging to the same MLD while the corresponding association is maintained. When the association response frame indicates rejection of the association request, all STAs in the STA MLD including the STA having transmitted the corresponding association request frame may transmit the probe request frame and the association request frame.

The timer expiry time point may be identical to a standby time for an association response frame to the association request frame.

The method of restricting only one association operation is performed for each STA MLD may be performed through a process of performing an association operation by only one STA among STAs included in the STA MLD as follows.

Figure 14:
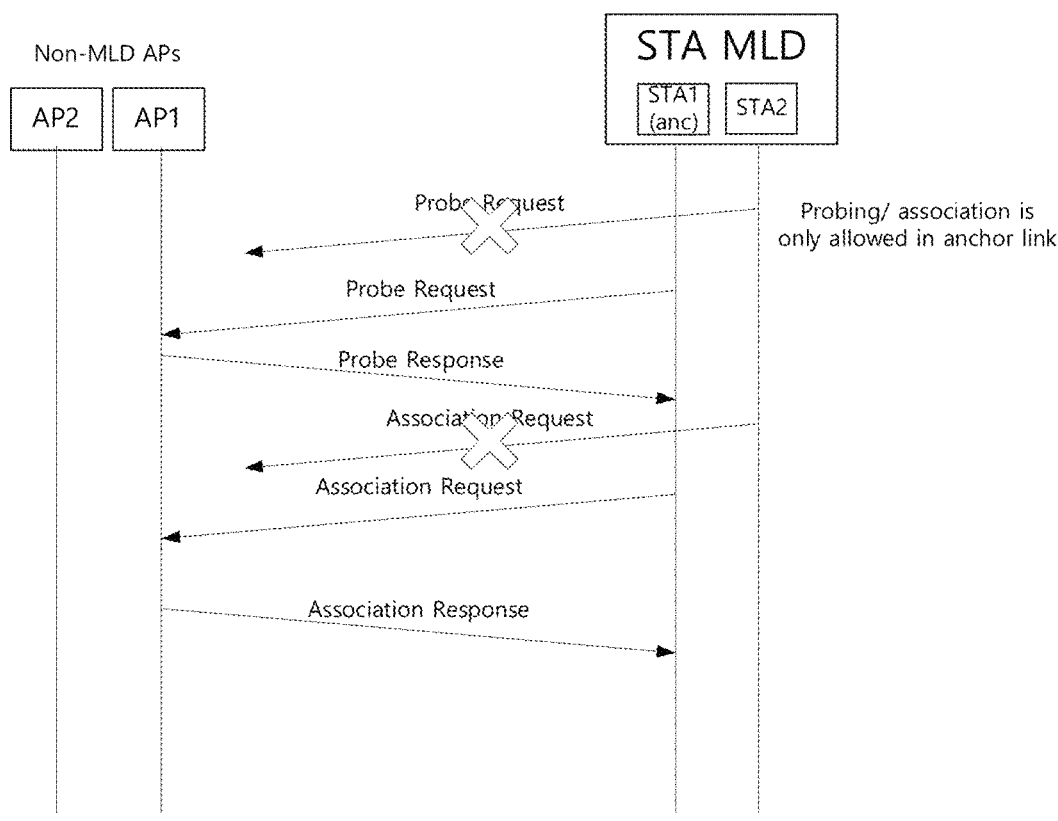
FIG. 14 is a flow chart illustrating an example of an association process causing an STA MLD not to perform more than one association operation according to an embodiment of the present invention.

FIG. 14 is a flow chart illustrating an example of an association process causing an STA MLD not to perform more than one association operation according to an embodiment of the present invention.

Referring to FIG. 14, when an STA transmits an association request frame for association, the other STAs belonging to the same STA MLD may not perform, for the AP, an association operation for association.

Specifically, the STA MLD may select one of the belonging STAs to allow scanning and association operations to be performed. The selected STA may be referred to as an anchor STA. For example, when STA 1 and STA 2 belong to an STA MLD, only STA 1 may be designated to perform the scanning and association operations. That is, STA 2 may fail to perform separate scanning and association operations.

The anchor STA may perform a passive scanning or active scanning operation in an operating channel. That is, a beacon frame transmitted by the AP may be received in the corresponding channel. Alternatively, a procedure of transmitting a probe request frame to an AP operating in the corresponding channel, and receiving a probe response frame from the AP may be performed. While performing the scanning operation, the anchor STA may identify whether an AP operating in the corresponding channel is an AP belonging to the AP MLD through the received beacon frame or probe response frame. When the anchor STA identifies the received beacon frame or probe response frame and the corresponding AP is an AP belonging to the AP MLD, the negotiation process for the multi-link operation, describe in FIG. 10, may be performed. When the anchor STA identifies the received beacon frame and probe response frame and the corresponding AP does not belong to the AP MLD, the association operation described in FIG. 5 may be performed.

When the association operation with the AP performed by the anchor STA includes a negotiation operation utilizing multiple links, as described in FIG. 10, another STA of the corresponding STA MLD may also perform a communication operation with the corresponding AP MLD after the association response frame is received from the corresponding AP. When the association operation performed with the AP by the anchor STA is the association operation with a single AP, described in FIG. 5, the corresponding function may be deactivated for another STA of the corresponding STA MLD after the corresponding STA receives the association response frame from the AP.

An STA not corresponding to an anchor STA, among STAs of the corresponding STA MLD, may fail to perform the scanning and association operations. That is, another STA belonging to the corresponding STA MLD may not allow the association request frame to be transmitted. Additionally, another STA belonging to the corresponding STA MLD may not allow the probe request frame to be transmitted.

A method of restricting to perform only one association operation for each STA MLD may be performed as follows so that the association operation is managed at the level of an STA MLD.

Figure 15:
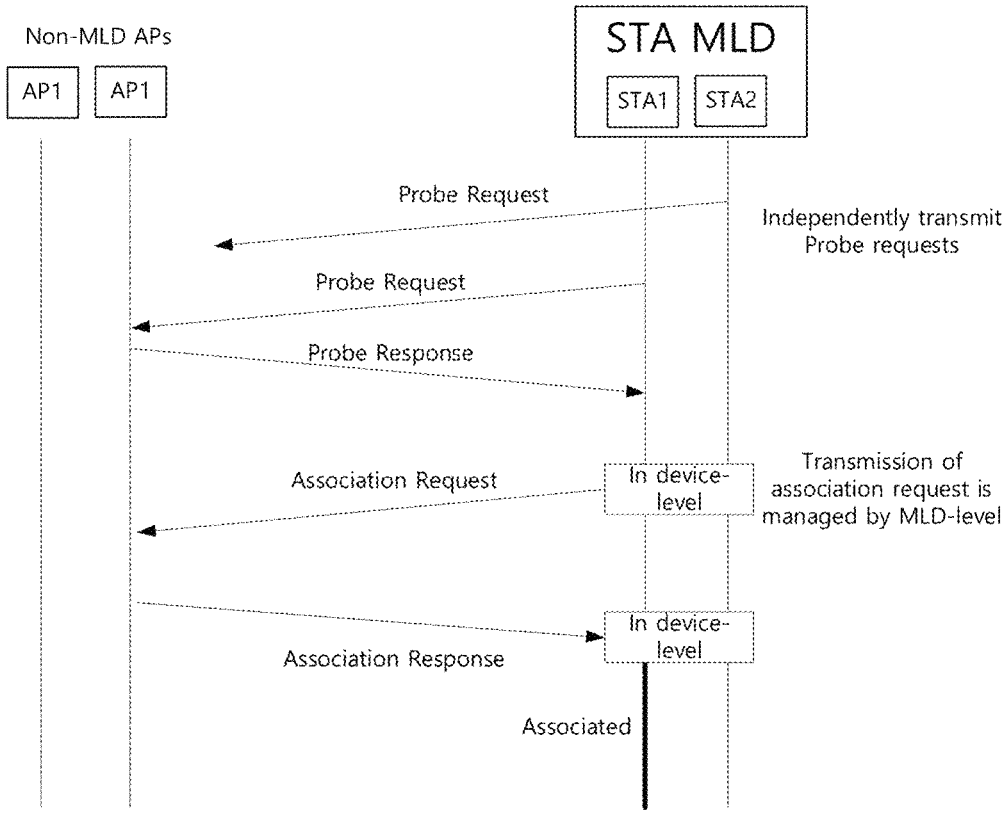
FIG. 15 is a flow chart illustrating another example of an association process for causing an STA MLD not to perform more than one association operation according to an embodiment of the present invention.

FIG. 15 is a flow chart illustrating another example of an association process for causing an STA MLD not to perform more than one association operation according to an embodiment of the present invention.

Referring to FIG. 15, an association procedure with an AP by STAs belonging to an STA MLD may be managed by an MLD STA so that the association procedure is performed by only one STA.

Specifically, the respective STA of the STA MLD may independently perform a scanning operation in the corresponding link. The scanning operation may include an operation of receiving a beacon frame and an operation of exchanging a probe request frame and a probe response frame, as described in FIG. 5. In addition, when it is identified in the scanning stage that the AP operating in the channel is an AP belonging to the MLD, a process of exchanging a multi-link probe request frame and a multi-link probe response frame may be performed as described in FIG. 10.

After completion of the scanning operation, the corresponding STA MLD may transmit an association request frame. In this case, transmission of the association request frame may be managed by the STA MLD. That is, in the STA MLD stage, a primitive (for example, MLME-ASSOCIA-TE.request) for requesting to transmit an association request frame to a specific STA among the belonging STAs may be transferred through a MAC sublayer management entity (MLME). In this case, when the AP which is to perform the association operation is an AP belonging to the AP MLD, the corresponding primitive including a MAC address of the AP MLD may be transferred. In this case, the corresponding primitive additionally including the MAC address of the AP may be transferred. When the AP which is to perform the association operation is an AP not belonging to the AP MLD, the corresponding primitive including the MAC address of the corresponding AP may be transferred.

The STA having received the primitive requesting to transmit the association request frame in the STA MLD stage may transmit an association request frame to the AP on the basis of the corresponding primitive. When the AP receiving the association request frame does not belong to the AP MLD, the association operation identical or similar to the association operation described in FIG. 5 may be performed. When the AP receiving the association request frame belongs to the AP MLD, the association operation may be performed as described in FIG. 10. In this case, the transmission operation of the association request frame is managed in the STA MLD stage, another STA of the corresponding STA MLD may not transmit the association request frame. When the AP receives an association response frame as a response to the association request frame, the corresponding STA may transfer a result of the association response frame to the STA MLD stage. In this case, the operation of transferring the result to the STA MLD stage may be performed through a primitive (for example, MLME-ASSOCIATE.confirm) reporting that the association response frame has been received from the AP. When the AP having transmitted the association response frame is an AP belonging to the AP MLD, the reported primitive may include the MAC address of the AP MLD. In this case, the MAC address of the AP may be additionally included. The AP having transmitted the association response frame is an AP not belonging to the AP MLD, the reported primitive may not include the MAC address of the AP.

When the AP having performed the association operation does not belong to the AP MLD, the AP may perform a communication operation with the STA with which the AP has exchanged the association request frame and the association response frame. That is, when the STA having been indicated to transmit the association request frame, through the primitive from the STA MLD stage, has successfully received the association response frame from the AP and the corresponding association request has been successfully performed or accepted, the corresponding STA may perform a communication operation with the AP. In this case, a communication function may be deactivated for another STA of the corresponding STA MLD for the corresponding association time.

Figure 16:
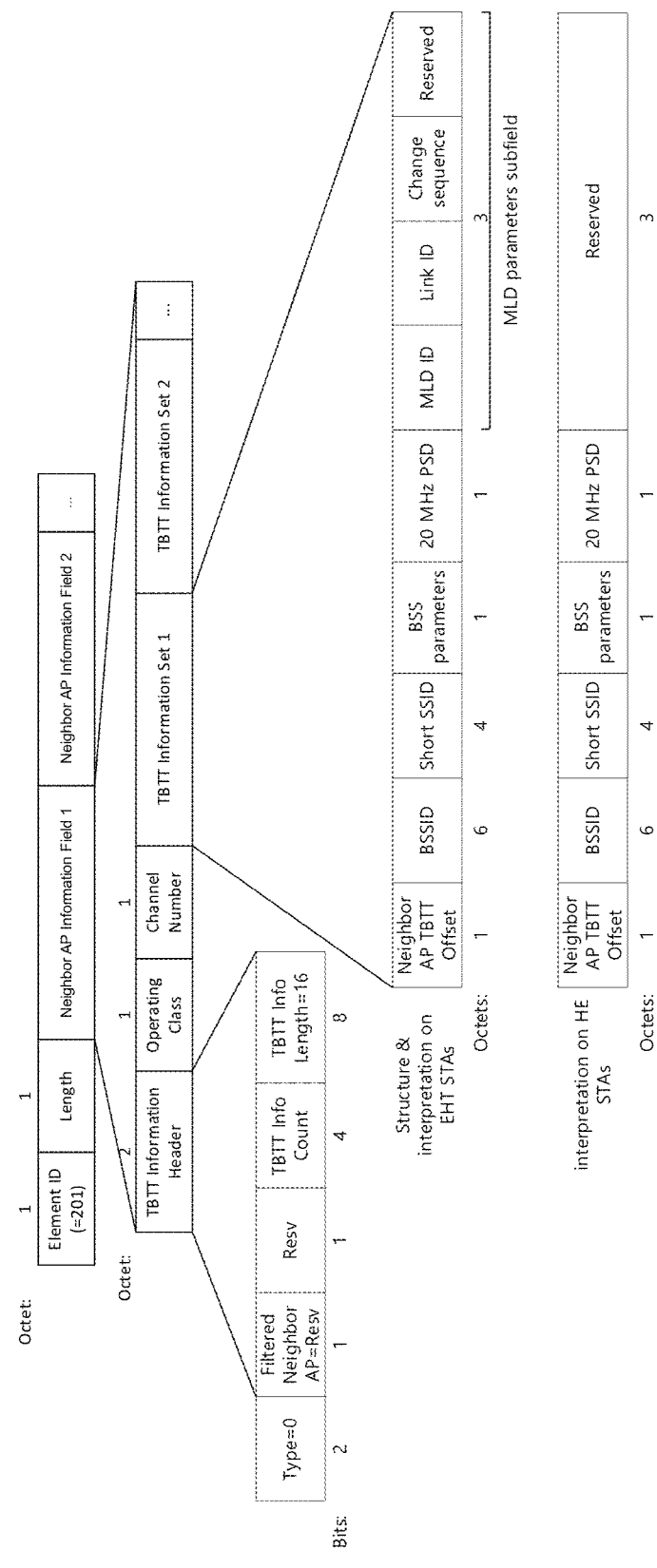
FIG. 16 illustrates an example of a structure of a reduced neighbor report (RNR) information element included to inform about information on another AP of the same MLD by an AP within an AP MLD according to an embodiment of the present invention.

FIG. 16 illustrates an example of a structure of a reduced neighbor report (RNR) information element included to inform about information on another AP of the same MLD by an AP within an AP MLD according to an embodiment of the present invention.

Referring to FIG. 16, an AP of an AP MLD may transmit information on other APs belonging to the same AP MLD, to an STA of an MLD STA. In this case, the information on the other APs may be referred to as RNR.

Specifically, as described above, the STA of the STA MLD may perform an association procedure for link setup with the AP of the AP MLD, and a message transmitted to the STA by the AP for such an association procedure may include an RNR information element corresponding to information of at least one of the other APs included in the same AP MLD as the AP. For example, a beacon frame and/or a probe response frame transmitted in the association procedure for link setup between the AP and the STA may include an RNR information element.

The RNR information element may include an element ID field, a length field, and multiple neighbor AP information fields. The multiple neighbor AP information fields may include information on APs neighboring a specific channel. That is, the multiple neighbor AP information fields may be configured for each channel in which the AP operates. The neighbor AP information field may include a target beacon transmission time (TBTT) header subfield, an operating class subfield, a channel number subfield, and multiple TB TT information fields. The TB TT information header subfield may indicate the details included in the TBTT information field, the length of one TBTT information field, etc. The operating class subfield and the channel number may indicate operating channels of APs indicated by the multiple TB TT information fields. The multiple TBTT information fields may include detailed information of an AP operating in a channel indicated by the operating class subfield and the channel number subfield. The TBTT information header subfield may be configured with the length of two bytes, the operating class subfield may be configured with the length of one byte, and the channel number subfield may be configured with the length of one byte.

The TBTT information header subfield may include a type subfield (or a TBRR information field type subfield), a filtered neighbor AP subfield, a reserved subfield, a TBTT information count subfield, and a TBTT information length subfield. The type subfield may be configured as 0. The filtered neighbor AP subfield and the reserved subfield may indicate (the number of TBTT information fields included in the neighbor AP information field)−1. For example, when the TBTT information count subfield is 3, it may be indicated that four TBTT information fields are included in the neighbor AP information field. The TBTT information length subfield may indicate the length of the TBTT information field included in the neighbor AP information field. The indicated length may be a unit of byte. In addition, the TBTT information length subfield may indicate the type of a subfield included in the TBTT information field. For example, the AP belonging to the AP MLD may indicate the TBTT information length subfield value within the RNR information element as 16.

The TB TT information length subfield indicates the length of the TB TT information field and/or the type of a subfield included in the TBTT information field, and thus the STA having received the RNR may recognize pieces of information (or the number and the types of subfields, etc.) included in the TBTT information field on the basis of the TBTT information length subfield.

That is, the types and the number of pieces of information included in the TBTT information field are determined according to the length, and thus the STA may recognize the length of the TBTT information field through the TBTT information length subfield, and may recognize the types and the number of pieces of information included in the configured TBTT information field according to the recognized length.

The neighbor AP information field may include the multiple TBTT information fields. The neighbor AP information field may include a TBTT information field corresponding to a number indicated by the TBTT information count subfield. For example, when the TB TT information length subfield value is 16, the TBTT information field may be configured with the length of 16 bytes. In addition, the TBTT information field may include a neighbor AP TBTT offset subfield, a BSSID subfield, a short-SSID subfield, a BSS parameters subfield, a 20 MHz PSD subfield, and an MLD parameters subfield. The neighbor AP TBTT offset subfield may indicate, in units of time units (Tus), a time from a time point at which the corresponding RNR information element is transmitted to a TBTT of the AP indicated by the TBTT information field. The neighbor AP TBTT offset subfield may have the length of one byte. The BSSID subfield may indicate a BSSID of the AP indicated by the TBTT information field. The length of the BSSID subfield may be six bytes. In this case, the BSSID may be a MAC address of the AP indicated by the TBTT information field. The short-SSID subfield may be a compressed value of a service set identifier (SSID) indicated by the AP indicated by the TBTT information field. The length of the short-SSID subfield may be four bytes. The BSS parameters subfield may include simple information of a BSS operation of the AP indicated by the TBTT information field. The length of the BSS parameters subfield may be one byte. The 20 MHz PSD subfield may indicate maximum power of a signal which can be used during transmission of a signal corresponding to a default category applied to the BSS of the AP indicated by the TBTT information field. The maximum transmission power may be indicated in the form of 2's complement. In this case, configuring the 20 MHz PSD subfield value as −128 may indicate the meaning of "reserved". Indicating the 20 MHz PSD subfield as 127 may indicate that the corresponding maximum transmission power is not specified. When the 20 MHz PSD subfield indicates Y corresponding to a value between −127 and 126, it may indicate that the corresponding maximum transmission power is Y/2 (dBm/MHz). In this case, the 20 MHz PSD subfield value may indicate a value from −63.5 (dBm/MHz) to +63 (dBm/MHz). The length of the 20 MHz PSD subfield may be one byte.

The MLD parameters subfield may include an MLD ID subfield, a link ID subfield, a change sequence subfield. In addition, the MLD parameters subfield may additionally add a reserved field. The MLD ID subfield may indicate an ID of an MLD to which the AP indicated by the TBTT information field belongs. In this case, when the AP indicated by the TBTT information field belongs to the same MLD as the AP for transmitting the corresponding RNR, the MLD ID may be indicated by a fixed specific value. The fixed specific value may be a value having all the corresponding fields filled with 1, or may be 0. The link ID may indicate an ID of a link allocated to an operating link of the corresponding AP in the MLD to which the AP indicated by the TBTT information field belongs. When a main parameter operating in the AP indicated by the TBTT information field changes, the change sequence subfield indicates a counter value increasing by 1. That is, when a main parameter of the AP indicated by the TBTT information field changes, the change sequence subfield indicates the same, and when the parameter changes, a value indicated by the field increases by 1. The length of the MLD parameters subfield may be three bytes.

When the MLD parameters subfield configures the length other than three bytes, the TBTT information length subfield value may indicate another value. This is according to the TBTT information length subfield value indicating the length of one TBTT information field. For example, when the MLD parameters subfield has the length of N bytes, the TBTT information length subfield value may indicate 13+N.

An STA performing the operation defined in IEEE 802.11ax and an STA belonging to the MLD may differently interpret the types of subfields included in the TBTT information field. Here, the STA performing the function of IEEE 802.11ax may be referred to as a HE STA. In the present invention, the HE STA may be an STA which fails to perform the function of IEEE 802.11be. An STA belonging to the MLD may be an extreme high throughput (EHT) STA defined in IEEE 802.11be. That is, the STA performing the function of IEEE 802.11be may be referred to as an EHT STA. When the HE STA receives an RNR information element, the TBTT information field may be interpreted as shown in Table 1 below according to a value indicated in the TBTT information length subfield included in the RNR information element.

When the MLD parameters subfield configures the length other than three bytes, the TBTT information length subfield value may be indicated by another value. This is according to the TBTT information length subfield value indicating the length of one TBTT information field. For example, when the MLD parameters subfield has the length of N bytes, the TBTT information length subfield value may indicate 13+N.

The subfields included in the TBTT information field may be interpreted differently according to the type of STA. That is, some fields included in the TBTT information field may not be interpreted and may be ignored according to the type of STA. In other words, according to the type of STA, some fields included in the TBTT information field may not perform decoding or may fail to perform decoding. In this case, the type of STA may be distinguished by the operation according to the standard to which the STA is applied. For example, the type of STA may be distinguished by a HE STA, an EHT STA, or an STA included in an MLD STA.

For example, when the TBTT information field has a predetermined size or greater, the HE STA may not decode or interpret and may ignore fields positioned after a specific bit, and the EHT STA and the STA included in the MLD may decode or interpret all fields of the TBTT information field.

Specifically, the HE STA corresponding to the STA performing the operation defined in IEEE 802.11ax and the STA belonging to the MLD may differently interpret the types of subfields included in the TBTT information field. In the present invention, the HE STA may be an STA which fails to perform the function of IEEE 802.11be. The STA belonging to the MLD may be an extreme high throughput (EHT) STA defined in IEEE 802.11be. That is, the STA performing the function of IEEE 802.11be may be referred to as an EHT STA. When the HE STA receives an RNR information element, the TBTT information field may be interpreted as in Table 1 below according to a value indicated by the TBTT information length subfield included in the RNR information element.

TABLE 1

| TBTT information length subfield value | Details included in TBTT information field |
|---|---|
| 1 | The Neighbor AP TBTT Offset subfield |
| 2 | The Neighbor AP TBTT Offset subfield, and the BSS Parameters subfield |
| 5 | The Neighbor AP TBTT Offset, and the Short SSID subfield |
| 6 | The Neighbor AP TBTT Offset subfield, the Short-SSID sub- field, and the BSS Parameters subfield |
| 7 | The Neighbor AP TBTT Offset subfield and the BSSID subfield |
| 8 | The Neighbor AP TBTT Offset subfield, the BSSID subfield, and the BSS Parameters subfield |
| 9 | The Neighbor AP TBTT Offset subfield, the BSSID subfield, the BSS Parameters subfield, and the 20 MHz PSD subfield |
| 11 | The Neighbor AP TBTT Offset subfield, the BSSID subfield and the Short SSID subfield |
| 12 | The Neighbor AP TBTT Offset subfield, the BSSID subfield, the Short-SSID subfield and the BSS Parameters subfield |
| 13 | The Neighbor AP TBTT Offset subfield, the BSSID subfield, the Short-SSID subfield, the BSS Parameters subfield and the 20 MHz PSD subfield |

TABLE 1-continued

| TBTT information length subfield value | Details included in TBTT information field |
|---|---|
| 0, 3, 4, 10 | Reserved |
| 14-255 | The first 13 octets of the TBTT information field indicate the Neighbor AP TBTT Offset subfield, the BSSID subfield, the Short-SSID subfield, the BSS Parameters subfield, and the 20 MHz PSD subfield (This is applied the same as when the TBTT information length subfield is 13). The remaining bits are recognized as a reserved field. |

The HE STA may decode and interpret only up to 13 bytes of the TBTT information field, and the field thereafter may be recognized as reserved fields, may be ignored, or may fail to be recognized. That is, as shown in FIG. 11, when the RNR information element is configured like a case where the TBTT information length subfield value exceeds "13" (that is, a case where the size of the TBTT information field is 14 bytes or more), the HE STA may interpret up to 13 bytes of each TBTT information field, and may ignore the remaining fields. For example, when the TBTT information length subfield value is 16, up to 13 bytes of each TBTT information field may be recognized to include the neighbor AP TBTT offset subfield, the BSSID subfield, the short-S SID subfield, the BSS parameters subfield, and the 20 MHz PSD subfield. However, when specific fields are positioned after the $13^{th}$ byte, the STA may fail to recognize or decode specific fields positioned after the $13^{th}$ byte, and recognize the same as a reserved field.

However, when the EHT STA receives an RNR information element, the TBTT information field may be interpreted as shown in Table 2 below according to a value indicated by the TBTT information length subfield included in the RNR information element. That is, even when receiving the same RNR information element as the above-described HE STA, the EHT STA may recognize or interpret fields that the HE STA fails to recognize or interpret. In other words, the EHT STA may recognize or interpret fields positioned after a specific bit in the RNR information element that the HE STA has failed to recognized or has ignored.

For example, when the TBTT information length subfield value indicates 14 or 15 (that is, when the length of the TBTT information field is 14 or 15 bytes), the EHT STA may interpret up to 13 bytes of each TBTT information field as the neighbor AP TBTT offset subfield, BSSID subfield, short-SSID subfield, BSS parameters subfield, short-SSID subfield, BSS parameters subfield, and 20 MHz PSD subfield, and ignore the remaining fields, like the HE STA. However, when the TBTT information length subfield value exceeds 16, unlike the HE STA, the EHT STA may decode fields after the $13^{th}$ byte. That is, the EHT STA may recognize and decode not only the neighbor AP TBTT offset subfield, BSSID subfield, short-S SID subfield, BSS parameters subfield, and 20 MHz PSD subfield corresponding to fields up to 13 bytes included in the TBTT information field, but also the MLD parameters subfield positioned thereafter, and the remaining fields may be ignored. As shown in FIG. 16, when the RNR information element is configured, each EHT STA may receive all of the neighbor AP TBTT offset subfield, BSSID subfield, short-SSID subfield, BSS parameters subfield, 20 MHz PSD subfield, and MLD parameters subfield included in the corresponding TBTT information field.

TABLE 2

| TBTT information length subfield value | Details included in TBTT information field |
| --- | --- |
| 1 | The Neighbor AP TBTT Offset subfield |
| 2 | The Neighbor AP TBTT Offset subfield and the BSS Parameters subfield |
| 5 | The Neighbor AP TBTT Offset subfield and the Short SSID subfield |
| 6 | The Neighbor AP TBTT Offset subfield, the Short-SSID sub- field, and the BSS Parameters subfield |
| 7 | The Neighbor AP TBTT Offset subfield and the BSSID subfield |
| 8 | The Neighbor AP TBTT Offset subfield, the BSSID subfield, and the BSS Parameters subfield |
| 9 | The Neighbor AP TBTT Offset subfield, the BSSID subfield, the BSS Parameters subfield, and the 20 MHz PSD subfield |
| 11 | The Neighbor AP TBTT Offset subfield, the BSSID subfield and the Short SSID subfield |
| 12 | The Neighbor AP TBTT Offset subfield, the BSSID subfield, the Short-SSID subfield and the BSS Parameters subfield |
| 13 | The Neighbor AP TBTT Offset subfield, the BSSID subfield, the Short-SSID subfield, the BSS Parameters subfield and the 20 MHz PSD subfield |
| 0, 3, 4, 10 | Reserved |
| 14, 15 | The first 13 octets of the TBTT information field indicate the Neighbor AP TBTT Offset subfield, the BSSID subfield, the Short-SSID subfield, the BSS Parameters subfield, and the 20 MHz PSD subfield (This is applied the same as when the TBTT information length subfield is 13). The remaining bits are recognized as a reserved field. |
| 16 | The Neighbor AP TBTT Offset subfield, the BSSID subfield, the Short-SSID subfield, the BSS Parameters subfield, the 20 MHz PSD subfield and the MLD Parameters subfield |
| 17-255 | The first 16 octets of the TBTT information field indicate the Neighbor AP TBTT Offset subfield, the BSSID subfield, the Short-SSID subfield, the BSS Parameters subfield, the 20 MHz PSD subfield, and the MLD Parameters subfield (This is applied the same as when the TBTT information length subfield is 16). The remaining bits are recognized as a reserved field. |

That is, as shown in Table 2, when the TBTT information length subfield value indicates a value equal to or greater than 16, the TBTT information field may include the neighbor AP TBTT offset subfield, the BSSID subfield, the short-SSID subfield, the BSS Parameters subfield, the 20 MHz PSD subfield, and the MLD Parameters subfield. In this case, when receiving the corresponding TBTT information field, the HE STA may failed to recognize and fail to decode fields positioned after the 13$^{th}$ byte. That is, the HE STA may recognize fields positioned after the 13$^{th}$ byte as reserved bits. However, when receiving the same TBTT information field, the EHT STA may recognize and decode all the fields positioned after the 13$^{th}$ byte.

The 20 MHz PSD subfield may be required only in a specific case. For example, the corresponding information may be required only when a channel indicated by the neighbor AP information field is a 6 GHz band. When the 20 MHz PSD subfield is not used, the TBTT information field is configured by including the MHz PSD subfield, as shown in FIG. 11, and the 20 MHz PSD subfield value may be indicated as a reserved value. The reserved value may be a value indicated by −128, as 2's complement, and may be a value having all the corresponding fields filled with 1. Alternatively, when the 20 MHz PSD subfield is not used, the TBTT information field is configured by including the 20 MHz PSD subfield, as shown in FIG. 16, and the 20 MHz PSD subfield value may be indicated as an undesignated value. The undesignated value may be a value indicated by +127, as 2's complement, and may be a value (01111111) having the first bit of the corresponding field filled with 0, and the remaining bits filed with 1.

For a case where the 20 MHz PSD subfield is not used, when the MLD ID exceptionally indicates −128 as 2's complement, the neighbor AP information field and the TBTT information field may be configured as follows.

Figure 17:
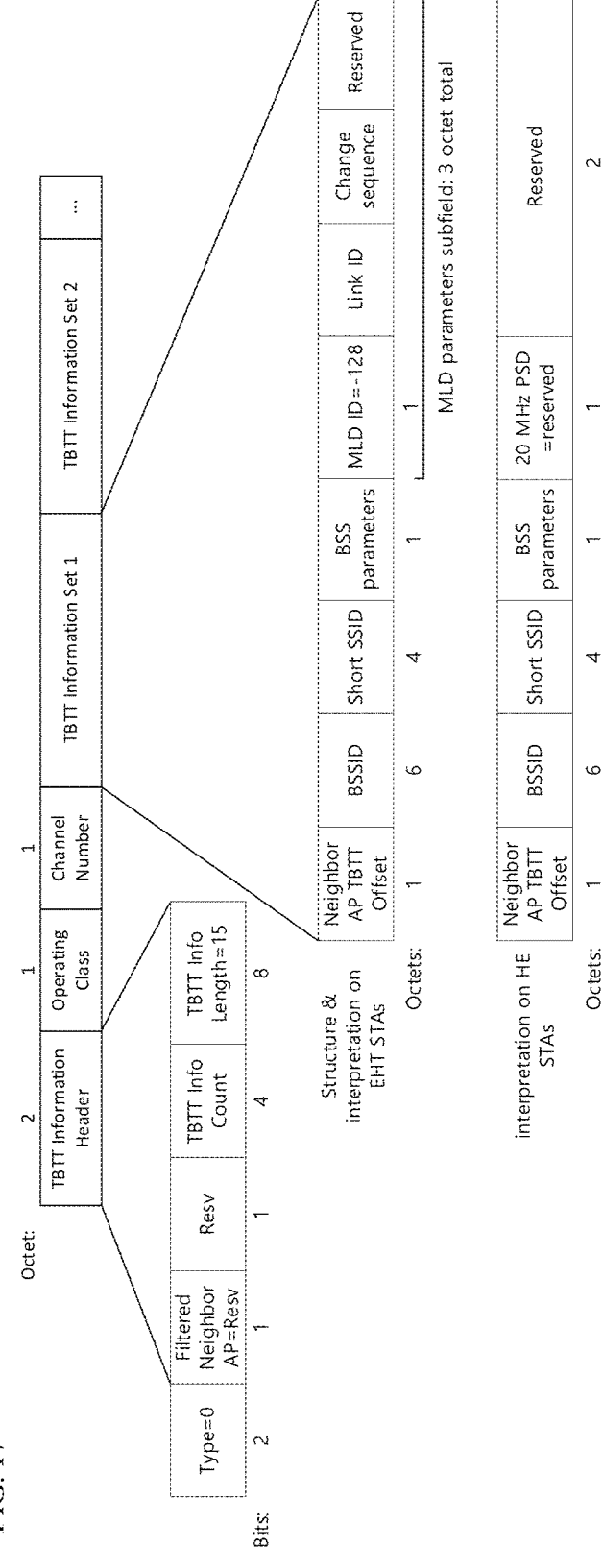
FIG. 17 illustrates an example of a structure of a neighbor AP information field of an RNR information element according to an embodiment of the present invention.

FIG. 17 illustrates an example of a structure of a neighbor AP information field of an RNR information element according to an embodiment of the present invention.

Referring to FIG. 17, a neighbor AP information field may be configured for each channel in which an AP operates. The neighbor AP information field may include a TBTT header subfield, an operating class subfield, a channel number subfield, and multiple TBTT information fields. In this case, a part remaining after excluding a TBTT information length subfield of the TBTT header subfield, the operating class subfield, and the channel number subfield may be configured as described in FIG. 16.

The TBTT information length subfield may be indicated by 15. This may indicate that the length of each TBTT information field within the corresponding neighbor AP information field is 15 bytes.

The TBTT information field may include a neighbor AP TBTT offset subfield, a BSSID subfield, a short-SSID subfield, a BSS parameters subfield, and an MLD parameters subfield. In this case, the neighbor AP TBTT offset subfield, the BSSID subfield, the short-SSID subfield, and the BSS parameters subfield may be configured as described in FIG. 11. The MLD ID may be configured by one byte.

The MLD parameters subfield may include an MLD ID subfield, a link ID subfield, and a change sequence subfield. In addition, the MLD parameters subfield may additionally include a reserved field. The length of the MLD parameters subfield may be three bytes. The link ID subfield and the change sequence subfield may be configured as described in FIG. 11. The MLD ID may indicate a specific value. The specific value is 2's complement, and may be −128. Alternatively, the specific value is 2's complement, and may be 127.

When an MLD ID is a specific value, it may be a case where an MLD ID of an MLD to which an AP indicated by the corresponding TBTT information field belongs indicates, by chance, the specific value. In this case, when the AP indicated by the TBTT information field may configure the MLD ID as 0 in case of an MLD identical to the MLD for transmitting the corresponding RNR.

A second example of a case where the MLD ID is a specific value may correspond to a case where the AP indicated by the TBTT information field configures the MLD ID as the specific value in a case of an MLD identical to the MLD for transmitting the corresponding RNR. In this case, when the information on another AP of the same MLD is transferred through the RNR information element, the 20 MHz PSD subfield may be omitted and the information may be transmitted as shown in FIG. 17.

When the HE STA receives the neighbor AP information field configured as shown in FIG. 17, the TBTT information field may be interpreted according to a value indicated by the TBTT information length subfield included in the RNR information element, as shown in Table 1. That is, the HE STA may recognize up to 13 bytes of each TBTT information field as the neighbor AP TBTT offset subfield, the BSSID subfield, the short-S SID subfield, the BSS parameters subfield, and the 20 MHz PSD subfield. In this case, the 20 MHz PSD subfield recognized by the HE STA may be a part corresponding to the MLD ID among the RNR information element transmitted by the AP MLD. As described above, when the MLD ID is configured as the specific value, the HE STA may not use the information included in the corresponding field even through the HE STA interprets the corresponding field as the 20 MHz PSD subfield.

Exceptionally, when it is allowed to configure a 15-byte TBTT information field as shown in FIG. 17, the EHT STA may interpret the TBTT information field according to a value indicated by the TBTT information length subfield, as shown in Table 3. Alternatively, when the TBTT information length subfield value is 14, it may be interpreted as a reserved value.

TABLE 3

| TBTT information length subfield value | Details included in TBTT information field |
| --- | --- |
| 1 | The Neighbor AP TBTT Offset subfield |
| 2 | The Neighbor AP TBTT Offset subfield and the BSS Parameters subfield |
| 5 | The Neighbor AP TBTT Offset subfield and the Short SSID subfield |
| 6 | The Neighbor AP TBTT Offset subfield, the Short-SSID subfield, and the BSS Parameters subfield |
| 7 | The Neighbor AP TBTT Offset subfield and the BSSID subfield |
| 8 | The Neighbor AP TBTT Offset subfield, the BSSID subfield, and the BSS Parameters subfield |
| 9 | The Neighbor AP TBTT Offset subfield, the BSSID subfield, the BSS Parameters subfield, and the 20 MHz PSD subfield |
| 0, 3, 4, 10 | Reserved |
| 11 | The Neighbor AP TBTT Offset subfield, the BSSID subfield and the Short SSID subfield |
| 12 | The Neighbor AP TBTT Offset subfield, the BSSID subfield, the Short-SSID subfield and the BSS Parameters subfield |
| 13 | The Neighbor AP TBTT Offset subfield, the BSSID subfield, the Short-SSID subfield, the BSS Parameters subfield and the 20 MHz PSD subfield |
| 14 | The first 13 octets of the TBTT information field indicate the Neighbor AP TBTT Offset subfield, the BSSID subfield, the Short-SSID subfield, the BSS Parameters subfield, and the 20 MHz PSD subfield (This is applied the same when the TBTT information length subfield is 13). The remaining bits are recognized as a reserved field. |
| 15 | The Neighbor AP TBTT Offset subfield, the BSSID subfield, the Short-SSID subfield, the BSS Parameters subfield, and the MLD Parameters subfield |
| 16 | The Neighbor AP TBTT Offset subfield, the BSSID subfield, the Short-SSID subfield, the BSS Parameters subfield, the 20 MHz PSD subfield and the MLD Parameters subfield |
| 17-255 | The first 16 octets of the TBTT information field indicate the Neighbor AP TBTT Offset subfield, the BSSID subfield, the Short-SSID subfield, the BSS Parameters subfield, the 20 MHz PSD subfield, and the MLD Parameters subfield (This is applied the same when the TBTT information length subfield is 16). The remaining bits are recognized as a reserved field. |

When receiving the neighbor AP information field configured as shown in Table 17, the EHT STA may recognize that each TBTT information field includes the neighbor AP TBTT offset subfield, the BSSID subfield, the short-SSID subfield, the BSS parameters subfield, and the MLD parameters subfield. Accordingly, all subfields included in the TBTT information field may be received.

When an operating channel of the AP included in the neighbor AP information field does not exist in a 6 GHz band and the HE STA does not use a value of the 20 MHz PSD subfield in a band other than the 6 GHz channel, an operation of configuring the neighbor AP information field may be additionally allowed as shown in FIG. 12 above.

As described in FIG. 10, a negotiation process for a multi-link operation performed by the STA MLD may include a scanning stage, a stage of transmitting a multi-link probe request frame and receiving a multi-link probe response frame, and an association stage for using the multi-link operation. A parameter for the multi-link operation may be transmitted in the form of the multi-link information element.

The beacon frame and the probe response frame may include the multi-link information element. When the beacon frame and the probe response frame include the multi-link information element, the multi-link information element may be configured as described below.

Figure 18:
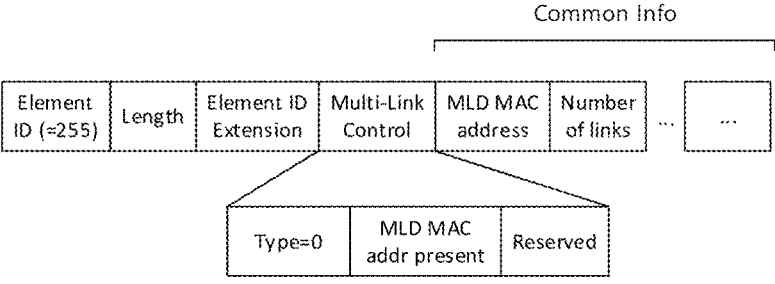
FIG. 18 illustrates an example of a structure of a multi-link information element included in a beacon frame or a probe response frame and transmitted by an AP MLD according to an embodiment of the present invention.

FIG. 18 illustrates an example of a structure of a multi-link information element included in a beacon frame or a probe response frame and transmitted by an AP MLD according to an embodiment of the present invention.

Referring to FIG. 18, a multi-link information element may include an element ID field, a length field, an element ID extension field, a multi-link control field, a common information field corresponding to a parameter for the corresponding AP MLD, and a link information field corresponding to information on a specific AP. The multi-link control field may include a type subfield. The type subfield may indicate the form of the multi-link information element. The multi-link control field may include an indicator indicating whether an MLD MAC address exists. When the corresponding indicator is configured as 1, it may indicate that a field indicating the MLD MAC address is added to the common information field of the corresponding multi-link information element. When the multi-link information element is transmitted in the beacon frame and the probe response frame, the corresponding multi-link information element may include only the common information field and may be transmitted. The common information field may include the MAC address of the MLD. In this case, an indicator indicating whether the MLD MAC address of the multi-link control field exists may be configured as 1. In addition, the common information field may additionally indicate the number of links operated by the corresponding AP MLD.

It may be indicated that the type of the multi-link information element included in the beacon frame and the probe response frame is basic. That is, the type subfield within the multi-link control field of the corresponding multi-link information element may be configured as 0.

As described in FIG. 10, the multi-link probe request frame transmitted by the STA MLD may request link information for multiple links included in the AP MLD. The multi-link probe request frame may indicate a requesting link through the multi-link information element. The multi-link information element included in the multi-link probe request frame may be configured as described below.

Figure 19:
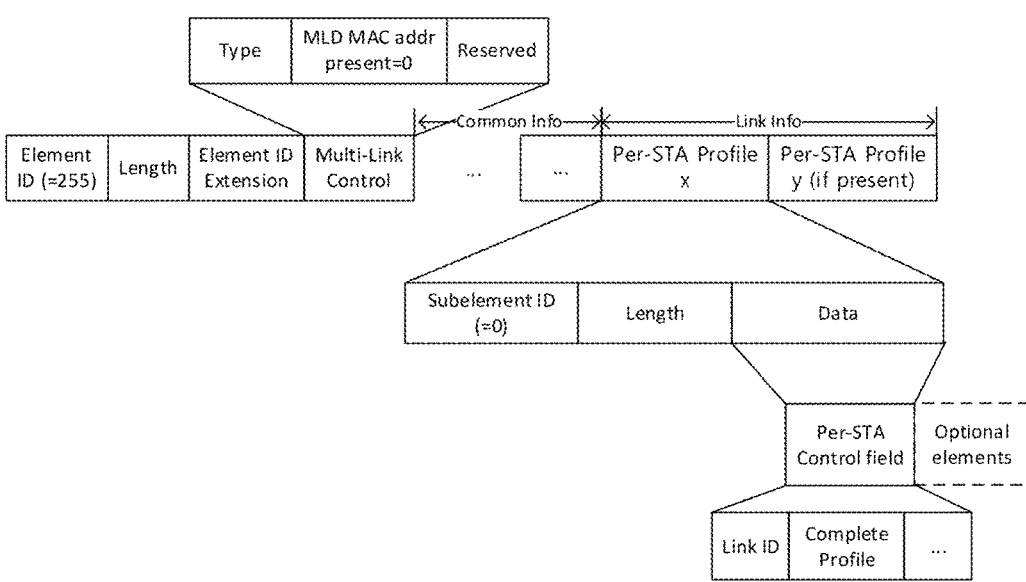
FIG. 19 illustrates an example of a structure of a multi-link information element included in a multi-link probe request frame and transmitted by an STA MLD according to an embodiment of the present invention.

FIG. 19 illustrates an example of a structure of a multi-link information element included in a multi-link probe request frame and transmitted by an STA MLD according to an embodiment of the present invention. A redundant description of FIG. 18 is omitted in FIG. 19.

Referring to FIG. 19, when an AP included in an AP MLD and an STA included in an MLD STA transmit or receive a frame for performing an association procedure for link setup, included fields may be change according to the type of a transmitted or received frame.

Specifically, in an association procedure for link setup, when an AP of an AP MLD and an STA of an STA MLD transmit or receive a multi-link probe request frame, a multi-link information element included in the multi-link probe request frame may include an element ID field, a length field, an element ID extension field, a multi-link control field, a common information field, and a link information field. The multi-link control field may include a type subfield. The type subfield may be configured as 1 to indicate that configuration is made in the form for the multi-link probe request frame. An MLD MAC address may not be included in the common information field. In this case, an indicator indicating whether the MLD MAC address exists in the multi-link control field may be configured as 0. In the common information field, information on the AP MLD for requesting link information or information on request information may be additionally included.

The link information in the multi-link information element may include one or more per-STA profiles. In this case, link information included in the multi-link probe request frame may include, in the per-STA profile, information on a link requested to the AP MLD by the corresponding STA MLD. In this case, each per-STA profile may indicate a link ID for a link requested to the AP MLD by the corresponding STA MLD. For example, the AP MLD may operate links 1, 2, and 3. The STA MLD may request, in link 1, link information for links 2 and 3 operated by the AP MLD. In this case, the multi-link information element within the multi-link probe request frame may include, in the link information field, the per-STA profile for link 2 and the per-STA profile for link 3, and transmit the same. In addition, when the STA MLD requests only some of the link information of the AP MLD, the corresponding STA MLD may additionally indicate request information requesting transmission of specific information from the AP in the per-STA profile. For example, specific information on the corresponding link, requested to the AP MLD by some of the optional element within the per-STA profile for link 2 or the per-STA profile for link 3, may be a request element or an extended request element. Alternatively, the STA MLD may request all information on a specific link from the AP MLD. In this case, the STA MLD may configure a complete profile subfield within the per-STA profile for a link, as 1, and transmit the same. Alternatively, the STA MLD may request all information on all links operated by the corresponding AP MLD. In this case, a link information field may not be included in the multi-link information element within the multi-link probe request frame transmitted by the STA MLD.

The AP MLD having received the multi-link probe request frame may identify a type subfield value included in the multi-link information element to identify that the corresponding STA MLD requests information on a link operated by the AP MLD. In this case, the information on the link operated by the AP MLD may be transmitted according to the request details included in the corresponding multi-link information element. For example, when the multi-link information includes only a common information field, the AP MLD may transmit the multi-link probe response frame including all information on all links operated by the corresponding AP MLD. Alternatively, when the multi-link information element includes one or more per-STA profiles, the AP MLD may transmit the multi-link probe response frame including only a link indicated by the per-STA profile. In this case, when the complete profile subfield within the per-STA profile of the multi-link information element is configured as 1, the AP MLD may transmit the corresponding multi-link probe response frame including all information corresponding to the link indicated by the corresponding per-STA profile. Alternatively, when request information requested to the AP MLD is indicated within the per-STA profile, the AP MLD may transmit the multi-link probe response frame including only information requested for the corresponding link. When there is redundant information requested for the multiple links, the request element or the extended request element may be separately transmitted through the multi-link probe request frame, and may not be included in the per-STA profile. In this case, when there is a separate request element or extended request element in the multi-link probe request frame, the AP MLD may determine that the corresponding information is requested for all links to include the corresponding request information in the multi-link probe response frame.

The AP MLD may transmit a multi-link probe response frame as a response to the multi-link probe request frame. A multi-link information element may be included in the multi-link probe response frame. In this case, the multi-link information element may be configured as follows.

Figure 20:
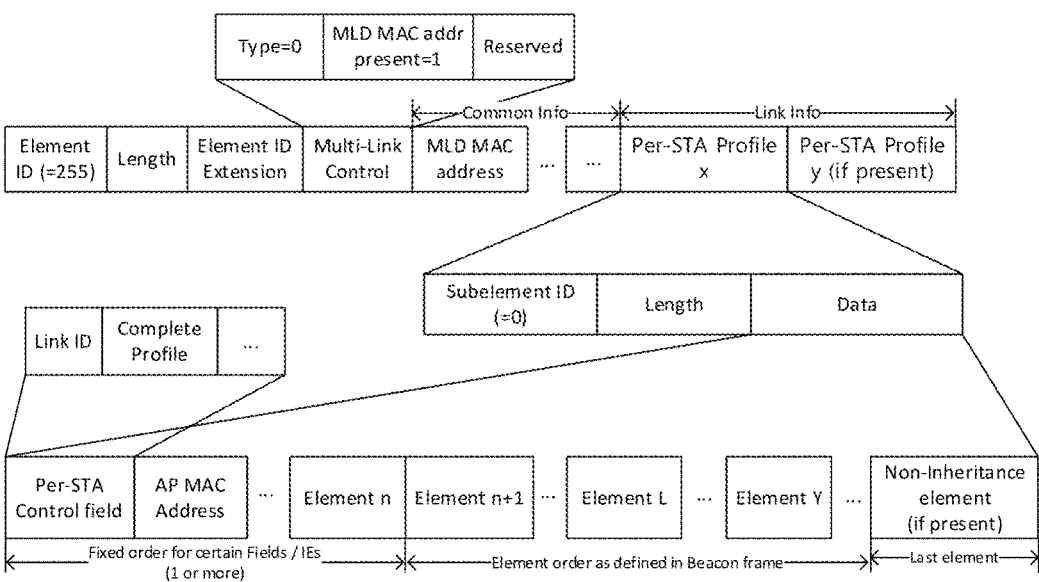
FIG. 20 illustrates a structure of a multi-link information element included in a multi-link probe response frame and transmitted by an AP MLD according to an embodiment of the present invention.

FIG. 20 illustrates a structure of a multi-link information element included in a multi-link probe response frame and transmitted by an AP MLD according to an embodiment of the present invention. A description identical to the part described in FIGS. 18 and 19 is omitted in FIG. 20.

Referring to FIG. 20, a multi-link information element included in a multi-link probe response frame may include an element ID field, a length field, an element ID extension field, a multi-link control field, a common information field, and a link information field. A type subfield in the multi-link control field may be configured as 0. That is, it may indicate that the type of the corresponding multi-link information element is basic. The common information field may include a MAC address of an MLD. In this case, an indicator indicating whether there is an MLD MAC address of the multi-link control field may be configured as 1. In addition, the common information field may additionally indicate the number of links operated by the corresponding AP MLD. In addition, the common information field may additionally indicate the number of per-STA profiles included in the corresponding multi-link information element.

When the type subfield is 0 and a link information field is included in the multi-link information element, a per-STA profile included in the corresponding link information may indicate information on an MLD for transmitting the corresponding multi-link information element. That is, when the corresponding per-STA profile is included in a beacon frame or a multi-link probe response frame and transmitted, the corresponding per-STA profile may include information on each AP in the AP MLD.

The link information field transmitted through the multi-link probe response frame may include link information of the AP MLD, requested by the STA MLD. The link information field may include one or more per-STA profile fields. Each of the per-STA profiles may include information on each AP belonging to the AP MLD. The per-STA profile may include a per-STA control field and one or more information fields. The per-STA control field may include a link ID subfield and a complete profile subfield. The link ID field may indicate an ID of a link corresponding to an AP indicating the per-STA profile. The link ID may be a value internally designated by an AP MLD. The link ID may have different values for each AP in the corresponding AP MLD. The value in the link ID field may be the same value as the link ID included when the information on the AP is included in the RNR information element and transmitted.

The complete profile subfield may indicate whether the corresponding per-STA profile includes all information on the corresponding AP. When the corresponding field is 1, the corresponding multi-link information element may indicate to include all information on the corresponding AP in the per-STA profile and transmit the same. The all information may be all frames transmitted by the AP in the beacon frame. In this case, the corresponding AP MLD may transmit the information by excluding information having the same parameter as a link for transmitting the multi-link probe response frame. In addition, when the RNR information element is separately included, the AP MLD may exclude the details included in the RNR information element and transmit the information.

When the AP MLD does not include the RNR information element in the multi-link probe response frame, a MAC address of the corresponding AP may be included in each per-STA profile and transmitted. The MAC address may be a BSSID corresponding to an ID of a BSS operated by the corresponding AP.

After exchange of the multi-link probe request frame and the multi-link probe response frame between the STA MLD and the AP MLD is completed, a multi-link association procedure may be performed between the STA MLD and the AP MLD. The multi-link association procedure may be performed through the operations in which the STA MLD transmits a multi-link association request frame including a multi-link information element, and the AP MLD transmits a multi-link association response frame including the multi-link information element, as a response to the association request frame. In this case, the type of the multi-link information element may be a basic type. Alternatively, the type of the multi-link information element used in the association process may be separately defined. Alternatively, the type of the multi-link information element used for the multi-link association request frame and the type of the multi-link information element used for the multi-link association response frame may be further divided and defined.

The multi-link information element included in the multi-link association request frame may be configured as described below.

Figure 21:
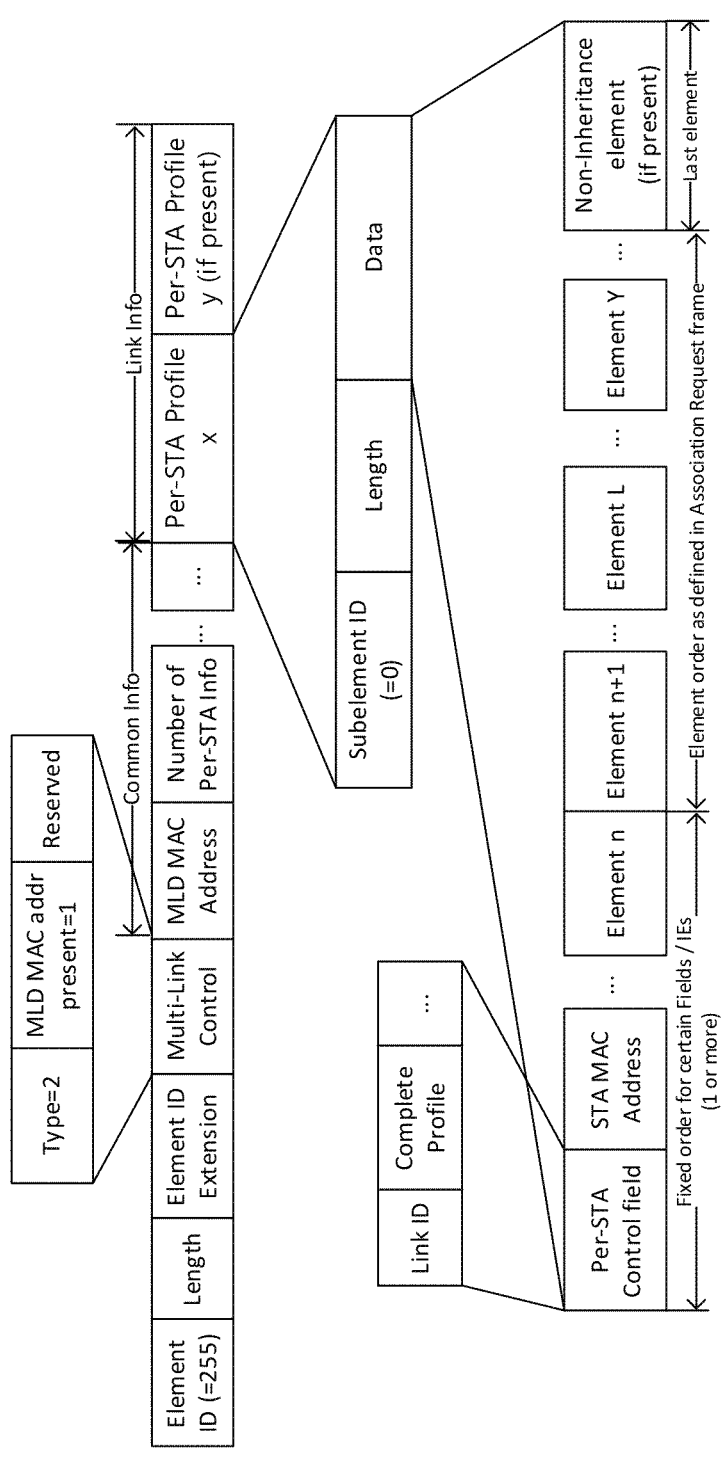
FIG. 21 illustrates a structure of a multi-link information element included in a multi-link association request frame and transmitted by an STA MLD according to an embodiment of the present invention.

FIG. 21 illustrates a structure of a multi-link information element included in a multi-link association request frame and transmitted by an STA MLD according to an embodiment of the present invention. A description identical to a part described in FIGS. 18 and 19 is omitted in FIG. 21.

Referring to FIG. 21, when an STA included in an STA MLD and an AP included in an AP MLD perform an association procedure for link setup, some fields may be or may not be included according to the type of a transmitted or received frame.

Specifically, when an AP of an AP MLD and an STA of an STA MLD perform an association procedure for link setup, the AP and the STA may transmit or receive messages related to channel access. In this case, the message related to channel access may include a type filed indicating the type of the message, some fields may be or may not be included according to the type indicated by the type field.

For example, when the STA transmits a request message related to channel access to the AP, the request message may include a multi-link element including a type subfield indicating the type of the request message.

In this case, the multi-link element of the request message may further include an MLD MAC address field for identifying an STA MLD and an STA MAC subfield which is for identifying the at least one station and includes a MAC address of each of at least one station, according to the type indicated by the type subfield. That is, when the type subfield indicates a basic type, the multi-link element of the request message may further include an STA MAC address field for identifying each STA. However, when the type subfield does not indicate a basic type, the multi-link element of the request message may not include an STA MAC address field for identifying each STA. In this case, the request message may be a probe request message or an association request message and may be referred to as a multi-link association request frame. Thereafter, the AP may transmit, to the STA, a response message as a response to the request message.

The multi-link information element included in the multi-link association request frame may include an element ID field, a length field, an element ID extension field, a multi-link control field, a common information field, and a link information field. A type subfield in the multi-link control field may be configured as 0. That is, it may be indicated that the type of the corresponding multi-link information element is a basic type. Alternatively, a type subfield in the multi-link control field may be configured as 2. That is, it may be indicated that the type of the corresponding multi-link information element is the type used in the multi-link association process. The common information field may include an MLD MAC address of the STA MLD. In this case, an indicator indicating whether the MLD MAC address of the multi-link control field exists may be configured as 1. In addition, the number of STAs included in the STA MLD may be additionally indicated in the common information field. This may be identical to the number of per-STA profiles included in the corresponding multi-link information element of the STA included in the STA MLD.

A link information field transmitted through the multi-link association frame may include one or more per-STA profile fields. Each of the per-STA profiles may include information on each STA belonging to the corresponding STA MLD. The information on the STA may include a function supported by each STA, an operating parameter, etc. In this case, a complete profile subfield in each per-STA profile field may be configured as 1. The information on the STA may include a MAC address of each STA. The MAC address may exist at the position subsequent to the corresponding per-STA control field.

When the STA MLD performs a multi-link operation with the AP MLD, an AP to be used may be indicated from among APs belonging to the AP MLD. In this case, an STA which desires to perform communication with an AP and an AP with which an STA desires to perform communication, that is, a mapping relationship between an STA and an AP, may be indicated. In this case, the corresponding STA MLD may indicate a link ID of a link through which mapping to the per-STA profile is to be made. That is, the STA MLD may request a multi-link operation so that an AP corresponding to a link ID included in the per-STA profile is mapped to an STA corresponding to a MAC address of an STA included in the corresponding per-STA profile. When the STA MLD does not want to specify a link ID to be used in the AP MLD, a link ID in the corresponding per-STA profile may be configured as a designated value. The designated value may be 15.

When a link ID is indicated by the per-STA profile, whether an STR operation between the corresponding link ID and another link indicated by the AP MLD is possible may be indicated by the per-STA profile. Whether the STR operation is possible may be indicated in the form of a bitmap. For example, when a bit corresponding to the first digit of a bitmap is 1, it may be indicated that an STR operation between a link ID indicated by the corresponding per-STA profile and a link having a link ID of 1 is possible. When a bit corresponding to the first digit of a bitmap is 0, it may be indicated that an STR operation between a link ID indicated by the corresponding per-STA profile and a link having a link ID of 1 is impossible.

Alternatively, when a link ID to be used for the multi-link association request frame is not specified, whether an STR operation is possible in each link of the AP may be indicated by a common information field.

The AP MLD may receive a multi-link association request frame transmitted by the STA MLD. The AP MLD may identify the details of the received multi-link association request frame. For example, when the type subfield in the multi-link control field of the received multi-link information element is 2, the AP MLD may identify that the corresponding multi-link information element is for the multi-link association request. Alternatively, when the type subfield in the multi-link control field of the multi-link information element is 0 and the corresponding multi-link information element is included in the association request frame, the AP MLD may identify that the corresponding multi-link information element is for the multi-link association request frame. The AP MLD may identify the multi-link information element in the received multi-link association request frame. When a link ID and a MAC address of an STA are indicated in the per-STA profile in the multi-link information element, the AP MLD may identify that it is requested that a link or an AP indicated by the link ID is to be used by an STA indicated by the MAC address of the STA.

When the AP MLD allows to perform the multi-link operation as indicated by the multi-link information element, the AP MLD may transmit the multi-link association response frame indicating acceptance of the multi-link association request. When the AP MLD does not allow to perform the multi-link operation as indicated by the multi-link information element, the AP MLD may transmit the multi-link association response frame indicating rejection of the multi-link association request.

The AP MLD may include the multi-link information element in the multi-link association response frame. In this case, the type of the multi-link information element may be a basic type. Alternatively, the type of the multi-link information element used in the association process may be separately defined. Alternatively, the type of the multi-link information element used for the multi-link association request frame and the type of the multi-link information element used for the multi-link association response frame may be further divided and defined. The multi-link information element included in the multi-link association response frame may be configured as described below.

Figure 22:
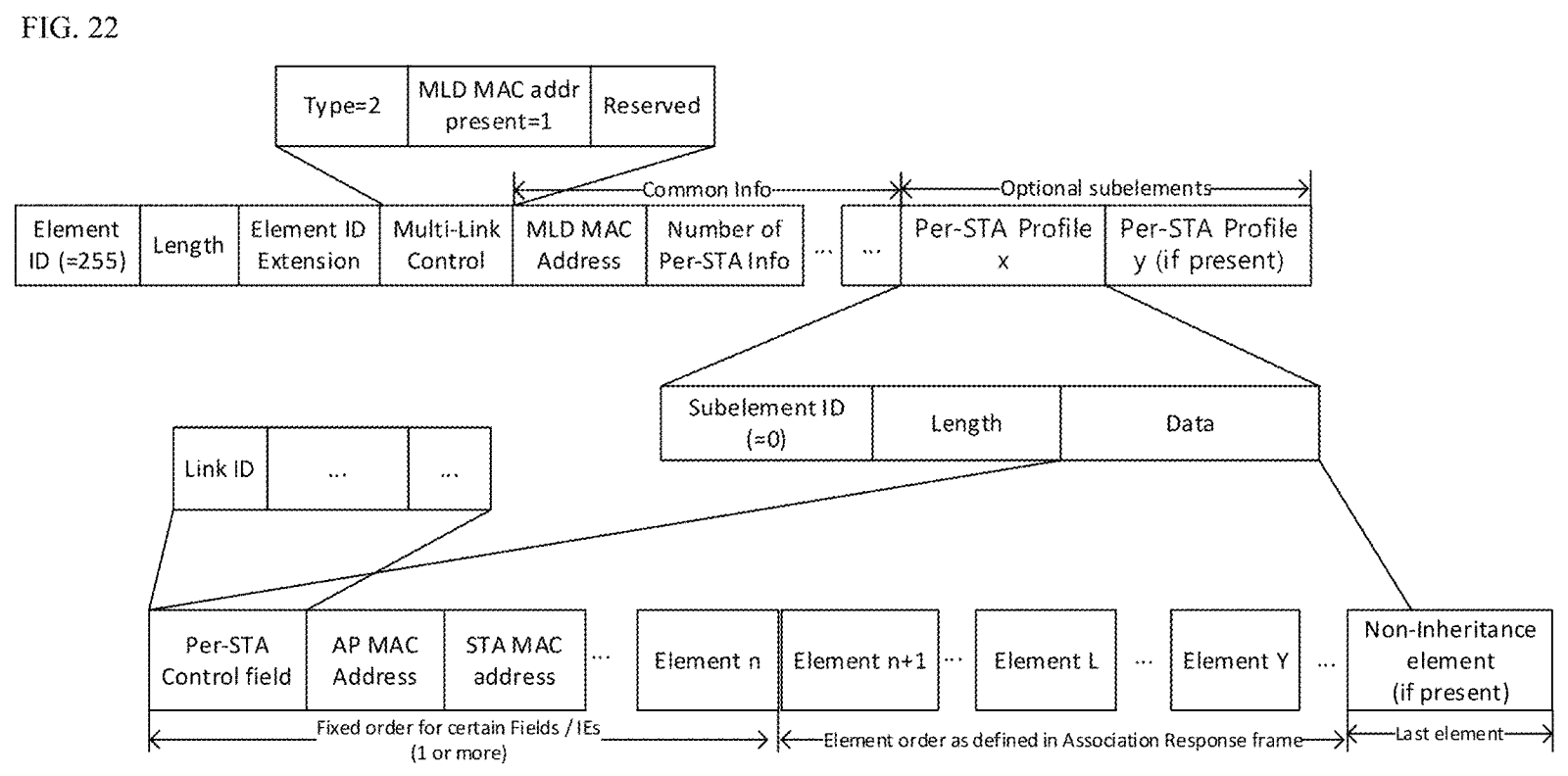

FIG. 22 illustrates a structure of a multi-link information element included in a multi-link association response frame and transmitted by an AP MLD according to an embodiment of the present invention.

Referring to FIG. 22, a multi-link information element included in a multi-link association response frame may include an element ID field, a length field, an element ID extension field, a multi-link control field, a common information field, and a link information field. A type subfield in the multi-link control field may be configured as 0. That is, the type of the corresponding multi-link information element may be a basic type. Alternatively, the type subfield in the multi-link control field may be configured as 2. That is, it may be indicated that the type of the corresponding multi-link information element is the type used in the multi-link association process. Alternatively, a type subfield of the multi-link control field may be configured as 3. That is, it may be indicated that the type of the corresponding multi-link information element is the type used in the multi-link association response frame. The common information field may include an MLD MAC address of the AP MLD. In this case, an indicator indicating whether the MLD MAC address of the multi-link control field exists may be configured as 1. In addition, the common information field may additionally indicate the number of per-STA profiles included in the corresponding multi-link information element. The number of the per-STA profiles may indicate the number of negotiated links when the AP MLD and the STA MLD perform the multi-link operation.

A link information field transmitted through the multi-link association frame may include one or more per-STA profile fields. Each of the per-STA profiles may include information on each AP belonging to the corresponding AP MLD. The information of each AP may be also referred to as information on each link operated by the AP MLD. The information on the AP may include an operating parameter for an operation performed by the corresponding AP in each link. The operating parameter may be the details of a beacon frame transmitted by the AP in the corresponding link. In addition, the per-STA profile may indicate a MAC address of the AP operating in the corresponding link. The MAC address of the AP may be a BSSID for the corresponding link. The position at which the MAC address of the AP is indicated may be identical to the position at which the STA MLD indicates, through the multi-link association request frame, the MAC address of the STA in the per-STA profile.

As another embodiment, the per-STA profile may indicate a MAC address of an STA to which mapping is allowed by the AP in the corresponding link. In this case, when the multi-link information element does not indicate the MAC address of the AP, but only indicates the MAC address of the mapped STA, the position at which the MAC address of the STA is indicated may be identical to the position at which the STA MLD indicates, through the multi-link association request frame, the MAC address of the STA in the per-STA profile.

As another embodiment, the per-STA profile may indicate both the MAC address of the AP operating in the corresponding link and the MAC address of the STA for the operation by the STA mapped in the corresponding link. In this case, the MAC address of the AP may be a BSSID of the corresponding link. The position at which the MAC address of the AP is indicated may be identical to the position at which the STA MLD indicates, through the multi-link association request frame, the MAC address of the STA in the per-STA profile. The position at which the MAC address of the STA is indicated may be subsequent to the position at which the MAC address of the AP is indicated.

As another embodiment, when mapping between the MAC address of the STA and the link ID, requested through the multi-link association request frame, is received without change, the MAC address of the AP operating in the corresponding link and the MAC address of the STA mapped to the corresponding link may be omitted from the per-STA profile.

The per-STA profile may additionally indicate whether an STR operation with another link negotiated for the STA MLD to perform a multi-link operation in the corresponding link is possible. Whether the STR operation is possible may be indicated in the form of a bitmap.

The complete profile subfield in each per-STA profile field may be configured as 1. That is, all information on the corresponding link may be included in the per-STA profile and transmitted.

After performing the negotiation process for the multi-link operation, the AP MLD and the STA MLD may perform the multi-link operation by utilizing the links indicated by each other. In this case, an STR operation is possible in a link in which the AP MLD and the STA MLD operate, the following operation may be performed.

Figure 23:
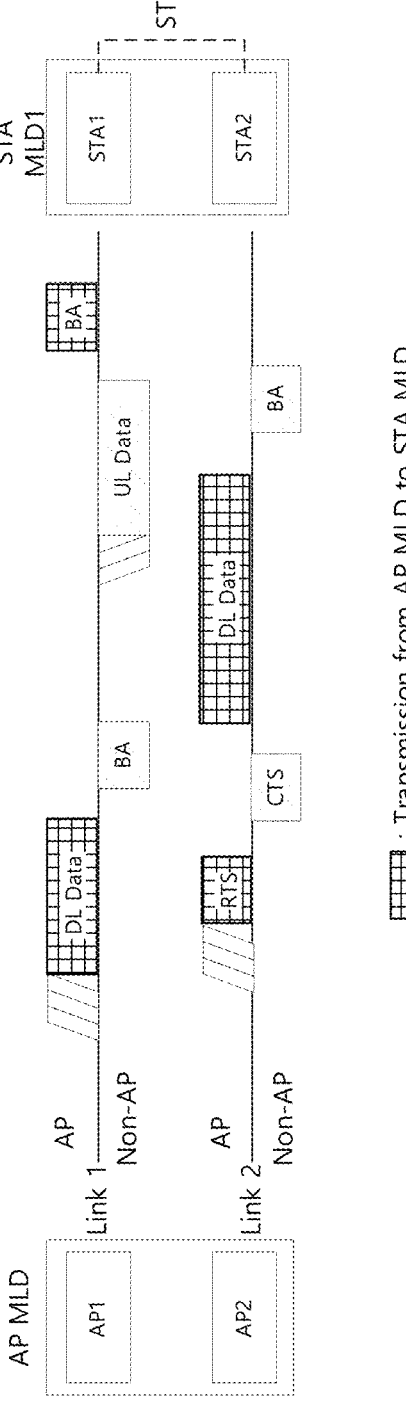
FIG. 23 illustrates a multi-link operation between a transmission MLD and a reception MLD which can perform an STR operation according to an embodiment of the present invention.

FIG. 23 illustrates a multi-link operation between a transmission MLD and a reception MLD which can perform an STR operation according to an embodiment of the present invention.

Referring to FIG. 23, an AP MLD and an STA MLD having completed a negotiation for the multi-link operation may perform a frame transmission or reception operation utilizing multiple links through a link-specific independent transmission scheme. When the multi-link operation is performed in the link-specific independent transmission scheme, each AP or terminal belonging to the AP MLD or the STA MLD independently performs a channel contention process for frame transmission in each link so as to perform frame transmission in each link. In this case, a transmission start time point and a transmission end time of a transmitted frame may vary in each link. When the independent transmission scheme is performed, a transmission opportunity (TXOP) acquired through the channel contention process in each link may be independently acquired in each link.

When the independent transmission scheme is performed, channel access is independently performed for each link according to a channel occupancy state, and thus each link can be more efficiently performed. In this case, when the STR operation is impossible in the AP MLD and the STA MLD since an interval between operation bands of the respective APs operated by the AP MLD is not sufficiently wide, the multi-link operation may not be performed in the independent transmission scheme.

When the reception MLD cannot perform the STR operation in some or all links, a frame transmission or reception process using a link in which the STR operation is impossible may be performed as follows.

Figure 24:
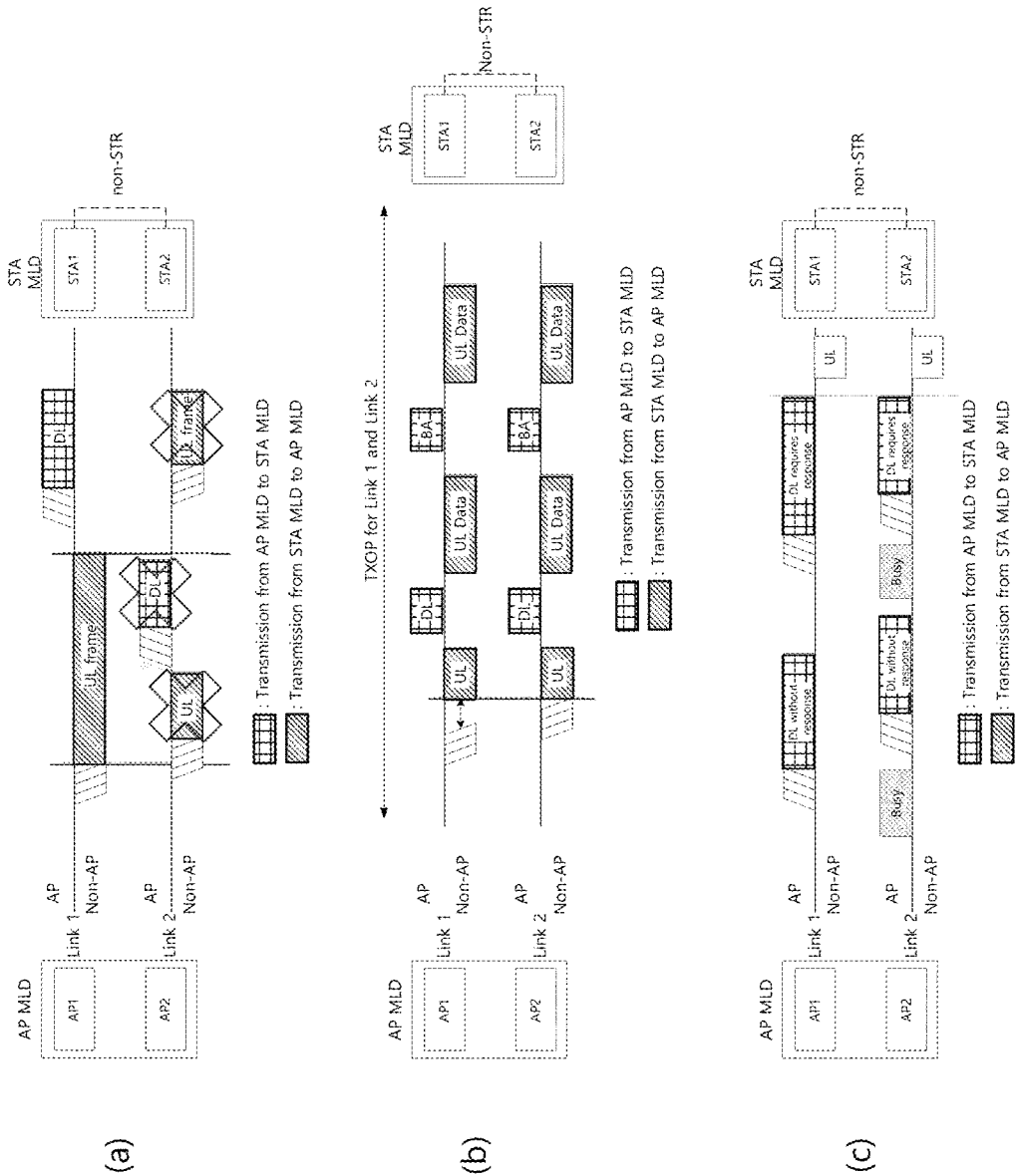
FIG. 24 illustrates a frame transmission or reception operation with an AP MLD when an STA MLD which cannot perform an STR operation in some or all links uses multiple links according to an embodiment of the present invention.

FIG. 24 illustrates a frame transmission or reception operation with an AP MLD when an STA MLD which cannot perform an STR operation in some or all links uses multiple links according to an embodiment of the present invention.

Referring to FIG. 24 (a), when an STR operation is impossible in an MLD, while frame transmission is performed in one link, a frame reception operation may fail to be performed in another link. For example, AP 1 and AP 2 belong to an AP MLD, wherein AP 1 may operate link 1 and AP 2 may operate link 2. STA 1 and STA 2 may belong to an STA MLD, wherein through a negotiation process for a multi-link operation, STA 1 may be associated with AP 1 and STA 2 may be association with AP 2. In this case, the STA MLD may not be able to perform an STR operation in link 1 and link 2. That is, while STA 1 performs a frame transmission operation in link 1, STA 2 may not be able to perform a frame reception operation in link 2. On the contrary, while STA 2 performs a frame transmission operation in link 2, STA 1 may not be able to perform a frame reception operation in link 1. The situation above where the STR operation cannot be performed may be caused due to interference in a device, which may occur during a frame transmission operation in one link. Due to the above-described interference in the device, when the STA MLD cannot perform the STR operation in some links, while a frame transmission operation is performed in one link among the corresponding links, a channel sensing operation may fail to be performed in another link. For example, while STA 1 transmits a frame in link 1, STA 2 may fail to perform a channel sensing operation for frame transmission in link 2. Accordingly, while STA 1 performs frame transmission in link 1, STA 2 may fail to start a channel content process and a frame transmission operation in link 2. That is, even when at least one of an AP MLD and an STA MLD cannot perform an STR operation in the corresponding link, the multi-link operation through the independent channel access, described in FIG. 18, may not be performed.

When a frame is transmitted in link 1, a frame reception operation may be impossible in a link in which an STR operation with link 1 is impossible. That is, when the AP MLD and the STA MLD cannot perform an STR operation in link 1 and link 2, while the corresponding MLD transmits a frame in link 1, a frame reception operation may be impossible in another link (for example, link 2). That is, during the corresponding time, another terminal may fail to receive a frame transmitted to the corresponding MLD. In addition, during the corresponding time, another terminal may fail to perform an operation of reserving a channel (for example, a NAV setup operation according to an RTS frame or a CTS frame transmitted from another terminal). According to the corresponding process, an MLD which cannot perform the STR operation may be restricted to perform a channel access operation for a specific time from a transmission end time point of the corresponding frame in another link when performing frame transmission using only one link among the corresponding links. The specific time may be referred to as MediumSyncDelay. The restriction of the frame transmission operation may correspond to a case where a channel contention process (for example, the channel contention and backoff operation described in FIG. 6), etc. may fail to be performed for the corresponding MediumSyncDelay. That is, the restriction may be a case where a distributed coordination function (DCF) and enhanced distributed channel access function (EDCAF) operation, defined in IEEE 802.11, may fail to be performed during the corresponding MediumSyncDelay. Alternatively, the restriction may correspond to an operation of reducing an energy level by which a channel is determined as a busy state when channel sensing is performed during the corresponding MediumSyncDelay. In this case, the adjusted energy level may be a value between −62 dMb and −82 dBm.

When an MLD which cannot perform the STR operation is to perform a frame transmission operation by utilizing multiple links, an operation of synchronizing frame transmission start time points may be performed in links that are used, as illustrated in FIG. 24(b). The frame transmission start time point may be referred to as a transmission start time point of a PPDU including the corresponding frame. A transmission start time point or a transmission end time point of a frame may be referred to as a transmission start time point or a transmission end time point of a PPDU including the frame. In this case, the channel access operation and the backoff operation may be independently performed in each link. When the channel access operation and backoff end time points of the respective links do not match, a frame transmission operation may be suspended while a backoff value is maintained as 0 in a link in which the channel access operation and the backoff operation are completed first. In this case, a time point at which a frame is transmitted in the corresponding link may be a time point at which channel access and backoff procedures are completed in another link and a frame is transmitted.

When an MLD which cannot perform an STR operation in the corresponding link is to consecutively perform a frame transmission or reception operation with a reception MLD, a transmission end time point of a transmitted frame may be matched. In this case, the transmission end time point of the frame may be referred to as a transmission time point of a PPDU including the frame. To match transmission end time points of the frame transmitted in two or more links, the MLD may add a padding bit or a padding field to the frame or the PPDU. Alternatively, a packet extension (PE) operation of extending the length of the PPDU may be performed. In addition, a consecutive frame transmission or reception operation is performed, frame transmission start time points may be matched in multiple links after the first frame exchange procedure.

When TXOP start time points are identical in multiple links, a TXOP time of frame transmission may be equally matched in the respective links. In this case, the simultaneous transmission-type multi-link operation may include a negotiation step for simultaneous transmission in multiple links, and a step of performing simultaneous transmission by using multiple links. The negotiation step for simultaneous transmission may include a step in which an MLD (for example, an AP MLD or an STA MLD) having data to be transmitted transmits a request frame for acquiring a TXOP for simultaneous transmission, to one or more links at an identical time point, and a step in which an MLD receiving data transmits a response frame after a short interframe space (SIFS) from a time point at which the reception of the request frame is completed. In this case, the response frame may be simultaneously transmitted in one or more links in which the request frame is received. The request frame may be a control frame. For example, the request frame may be an RTS or a multi-user (MU)-RTS frame, and the response frame may be a CTS frame. When a channel of one link is in a busy state while channel content for performing a simultaneous transmission operation is performed, a channel access process for performing the simultaneous transmission operation may be performed, or a frame transmission operation using only a link having an empty channel may be performed. Even though the operation of transmitting and receiving the request frame and the response frame for acquiring the TXOP is not simultaneously performed in multiple links, a frame exchange procedure may be simultaneously performed in multiple links thereafter. When the pre-frame exchange procedure is simultaneously performed, it may mean that start time points of a PPDU including a frame are identical in multiple links, and end time points of the corresponding PPDU are identical in multiple links.

When the AP MLD can perform the STR operation and the STA MLD cannot perform the STR operation in the corresponding link, the transmission start time points and the transmission end time points of the frame transmitted through multiple links from the AP MLD may not be identical. The AP MLD may be a transmission MLD for performing a transmission operation, and the STA MLD may be a reception MLD for performing a reception operation. That is, a transmission MLD which can perform the STR operation may independently perform a frame transmission operation after starting frame transmission in one link and completing a channel contention process for frame transmission in another link, as shown in FIG. 24(c). For example, the transmission MLD may be an AP MLD, and the reception MLD may be an STA MLD. The AP MLD may be able to perform the STR operation in link 1 and link 2, and the STA MLD may not be able to perform the STR operation in link 1 and link 2. When a channel access operation and a backoff procedure are completed first in link 1 while the AP MLD performs a channel access operation for a frame transmission operation in each link, AP 1 of the AP MLD may perform a frame transmission operation first in link 1. Since the AP MLD can perform the STR operation, and thus AP 2 may perform the channel contention process for frame transmission in link 2 while AP 1 transmits the frame in link 1. After completing the channel contention process and the channel access operation, AP 2 may perform the frame transmission operation by using link 2. The STA MLD is not performing frame transmission in link 1, and thus STA 2 may receive the frame transmitted by AP 2, in link 2. When one or more frames transmitted by the transmission MLD require an immediate response (for example, a BlockAck frame, etc.) from one or more reception MLDs, the transmission of the corresponding response frame may be performed while the reception operation is performed in another link. The transmission start time point of the immediate response frame may be a time point an SIFS from a time point at which the transmission MLD completes transmitting the frame. Alternatively, the transmission time point of the immediate response frame may be a time point within a PIFS from a time point at which the transmission MLD completes transmitting the frame. In this case, due to the transmission of the response frame, a frame reception operation cannot be seamlessly performed in another link. To prevent the corresponding situation, when one or more frames transmitted from the transmission MLD require transmission of a response frame, transmission end time points of the PPDU including the frame transmitted in the multiple links may be matched. That is, when the frame transmitted by the AP MLD requires transmission of the immediate response frame from an STA which cannot perform the STR operation, the transmission completion time points of the frame transmitted by the AP MLD by utilizing two or more links may be matched. When the transmission end time points of the frame are matched, it may mean that a difference between the transmission end time points of the PPDU transmitted in two or more links is 8 μs or less. Alternatively, when channel sensing is to be performed in the STA MLD which cannot perform the STR operation, when the transmission end time points of the frame are matched, it may mean that a difference between the transmission end time points of the PPDU transmitted in two or more links is 4 μs or less.

When the STA MLD cannot perform the STR operation or does not receive a frame in a link in which the STR is impossible, each STA of the corresponding STA MLD needs to transmit a CTS frame according to a channel sensing result when the MU-RTS frame is received. That is, when an STA operating in another link of the STA MLD in which the STR operation is impossible has acquired a TXOP (TXOP owner), or is not an STA (TXOP responder) for transmitting a response frame in the TXOP, each STA of the corresponding STA MLD may need to determine transmission of a CTS frame according to the channel sensing result when the MU-RTS frame is received. In this case, when the conditions above are all satisfied, the corresponding STA needs to transmit the CTS frame after the SIFS from the reception end time point of the MU-RTS frame.

1) A case where a user info field of the MU-RTS frame indicates an AID of the corresponding STA, and 2) a channel is idle as a result of channel sensing (a physical sensing operation and a virtual sensing operation).

When the STA MLD cannot perform the STR operation and an STA operating in another link of the STA MLD in which the STR operation is impossible has acquired a TXOP (TXOP owner), or is an STA (TXOP responder) for transmitting a response frame in the TXOP, the CTS frame may not be transmitted as a response to the MU-RTS frame even when both conditions are all satisfied. In this case, when both conditions are satisfied, the CTS frame may be transmitted as a response to the MU-RTS frame. Alternatively, an operation of not transmitting the CTS frame as a response to the MU-RTS frame may be performed only in a case where an STA operating in another link of an STA MLD which cannot perform the STR operation has acquired the TXOP (TXOP owner), or is an STA (TXOP responder) for transmitting a response frame in the TXOP, and the corresponding MU-RTS frame is a frame transmitted to a single STA. In this case, when the MU-RTS frame is a frame transmitted to a single STA, it may mean a case where the number of user info fields of the corresponding MU-RTS frame is one.

Except for a case where the STA MLD can perform the STR operation, or a case where even though the STA MLD cannot perform the STR operation, an STA operating in another link of the STA MLD which cannot perform the STR operation has acquired the TXOP (TXOP owner), or is an STA (TXOP responder) for transmitting the response frame in the TXOP, when a trigger frame or a triggered response scheduling (TRS) control field is received, whether to response thereto needs to be determined. In this case, when the STA satisfied all the following conditions, a TB PPDU needs to be transmitted as a response to the trigger frame or the TRS control field within an SIFS after receiving the corresponding frame.

1) A case where an AID included in a corresponding trigger frame or TRS control frame indicates an AID of a corresponding STA, or a case where a corresponding trigger frame includes an RA-RU and a corresponding STA allows frame transmission in a corresponding RU 2) A case where a CS required field in a corresponding trigger frame is 1 and a corresponding channel is idle as a result of channel sensing in a corresponding STA, a CS required field in a corresponding trigger frame is 0, or a response to a TRS control field is made 3) A case where an operating mode (OM) control field transmitted by a corresponding STA has not been transmitted, or in the most recently transmitted OM control field, "UL MU Disable" is configured as 0 and "UL MU Data Disable" is configured as 0

The TB PPDU may be a HE TB PPDU or an EHT TB PPDU.

In a case where the STA MLD cannot perform the STR operation and an STA operating in another link of the STA MLD which cannot perform the STR operation has acquired the TXOP (TXOP owner), or an STA (TXOP responder) for transmitting a response frame in the TXOP, even when the three conditions are all satisfied, a TB PPDU may not be transmitted as a response to the trigger frame or the TRS control field. In this case, when the three conditions are satisfied, a TB PPDU may be transmitted as a response to the trigger frame or the TRS control field. Alternatively, an operation of not transmitting the TB PPDU as a response to the trigger frame or the TRS control field may be performed only when an STA operating in another ink of the STA MLD which cannot perform the STR operation (TXOP owner), or is an STA (TXOP responder) for transmitting the response frame in the TXOP, and the corresponding trigger frame or TRS control field is a frame transmitted to a single STA. In this case, the trigger frame or the TRS control field is a frame transmitted to a single STA only when, as an STA for transmitting a response to the corresponding trigger frame or TRS control field, there is a corresponding STA only.

Figure 25:
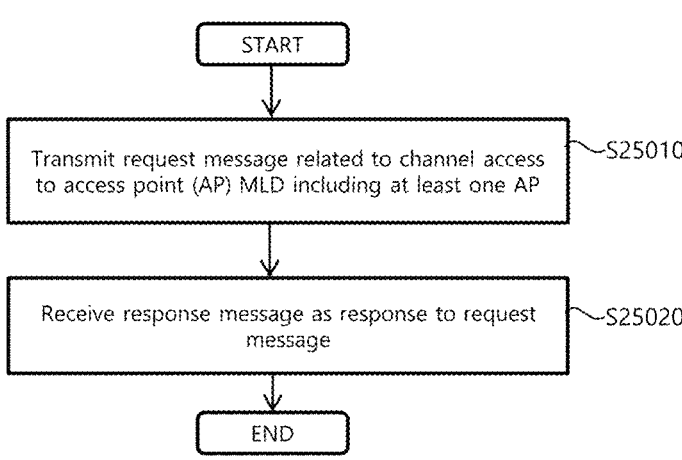
FIG. 25 is a flow chart illustrating an example of an operation of a terminal according to an embodiment of the present invention.

FIG. 25 is a flow chart illustrating an example of an operation of a terminal according to an embodiment of the present invention.

Referring to FIG. 25, when an AP belonging to an AP MLD and an STA belonging to an STA MLD perform a channel association procedure for link setup, a field included according to the type of a transmitted or received frame may vary, and some fields may not be decoded according to the type of the STA.

Specifically, the STA may transmit a request message related to channel access to the AP MLD including at least one access point (AP) (S25010). In this case, the STA may be included in the STA MLD including at least one STA.

The request message may include a multi-link element including a type subfield indicating the type of the multi-link element. The multi-link element may further include an STA MAC address subfield including a MAC address of each of the at least one station, for identifying the at least one station, and an MLD MAC address subfield for identifying the MLD, according to the type indicated by the type subfield.

Thereafter, the STA may receive a response message as a response to the request message from the AP (S25020).

When the type subfield indicates that the type of the multi-link element is basic, the multi-link element may include the STA MAC address subfield. However, when the type subfield does not indicate that the type of the multi-link element is basic, the multi-link element may not include the STA MAC address subfield.

The request message may be an association request message for requesting the channel access, and the response message may be an association response message corresponding to a response to the association request message. In this case, the multi-link element of the association request message may include the STA MAC address subfield, and the association response message may include the STA MAC address subfield at the same position as the association request message.

The response message may includer neighbor AP information corresponding to information on an AP different from an AP having transmitted the response message among the at least one AP included in the AP MLD, and bytes after a specific byte of the neighbor AP information may not be decoded according to the type of the STA.

When the STA is an EHT STA, bytes after the specific byte may be decoded, and when the STA is not an EHT STA, bytes after the specific byte may not be decoded. In this case, the specific byte may be the 13$^{th}$ byte.

The neighbor AP information may further include a length field indicating the length of the neighbor AP information, and one or more fields included in the neighbor AP information may be identified on the basis of the length field value.

The above-mentioned description of the present invention is for illustrative purposes, and it will be understood that those who skilled in the art to which the present invention belongs can easily modify the present invention in other specific forms, without altering the technical ideas or essential characteristics of the present invention. Therefore, the embodiments described above are illustrative and are not limited in all aspects. For example, each element described as a single entity may be distributed and implemented, and likewise, elements described as being distributed may also be implemented in a combined form.

The scope of the present invention is defined by the appended claims rather than the above detailed description, and all changes or modifications derived from the meaning and range of the appended claims and equivalents thereof should be interpreted as being included within the scope of the present invention.

The invention claimed is:

1. A station (STA) of a multi-link device (MLD) configured to operate in a wireless communication system, the STA comprising:

a transceiver; and a processor, wherein the MLD comprises two or more STAs, and the processor is configured to:

transmit a request frame related to a multi-link (ML) setup to an access point (AP) MLD comprising two or more APs, wherein the request frame includes a first multi-link element including a type field indicating a type of the first multi-link element; and receive a response frame as a response to the request frame, when the type of the first multi-link element indicated by the type field is a basic type, the first multi-link element includes one or more first Per-STA Profile subelements associated with each of one or more STAs among the two or more STAs, excluding the STA, and each of the one or more first Per-STA Profile subelements includes a STA medium access control (MAC) address field indicating a MAC address of a specific STA corresponding to each of the one or more first Per-STA Profile subelements when each of the one or more first Per-STA Profile subelements includes a complete profile of the specific STA, and when the type of the first multi-link element indicated by the type field is a probe request, the first multi-link element does not include the STA MAC address field.

2. The STA of claim 1, wherein, when the request frame is an association request frame for requesting the ML setup, the association request frame includes the first multi-link element of the basic type.

3. The STA of claim 2, wherein, when the response frame is an association response frame corresponding to a response to the association request frame, the association response frame includes a second multi-link element including a type field indicating a type of the second multi-link element included in the association response frame, when the type of the second multi-link element included in the association response frame indicated by the type field is the basic type, the second multi-link element included in the association response frame includes one or more second Per-STA Profile subelements associated with each of one or more APs among the two or more APs, excluding an AP that transmitted the association response frame, and each of the one or more second Per-STA Profile subelements included in the second multi-link element of the association response frame includes a STA MAC address field indicating a MAC address of a specific AP corresponding to each of the one or more second Per-STA Profile subelements when each of the one or more second Per-STA Profile subelements includes a complete profile of the specific AP.

4. The STA of claim 1, wherein the response frame comprises a neighbor AP information field corresponding to information on an AP other than an AP having transmitted the response frame, among the two or more APs included in the AP MLD, and wherein octets after a specific octet of a target beacon transmission time (TBTT) information field included in the neighbor AP information field are not processed according to a type of the STA.

5. The STA of claim 4, wherein, when the STA is an extremely high throughput (EHT) STA, the octets after the specific octet are processed, and wherein, when the STA is a high efficiency (HE) STA, the octets after the specific octet are not processed.

6. The STA of claim 4, wherein the specific octet is a $13^{th}$ octet.

7. The STA of claim 4, wherein the neighbor AP information field further comprises a length field indicating a length of the TBTT information field included in the neighbor AP information field, and wherein one or more fields included in the TBTT information field included in the neighbor AP information field are identified on the basis of a value of the length field.

8. The STA of claim 1, wherein a common information field included in the first multi-link element does not include an MLD MAC address field specifying a MAC address of the MLD when the type of the first multi-link element indicated by the type field is a probe request.

9. A method for transmitting a frame by a station (STA) of a multi-link device (MLD) configured to operate in a wireless communication system, the method comprising:

transmitting a request frame related to a multi-link (ML) setup to an access point (AP) MLD comprising two or more APs, wherein the multi-link device comprises two or more STAs, and wherein the request frame includes a first multi-link element including a type field indicating a type of the first multi-link element; and receiving a response frame as a response to the request frame, when the type of the first multi-link element indicated by the type field is a basic type, the first multi-link element includes one or more first Per-STA Profile subelements associated with each of one or more STAs among the two or more STAs, excluding the STA, and each of the one or more first Per-STA Profile subelements includes a STA medium access control (MAC) address field indicating a MAC address of a specific STA corresponding to each of the one or more first Per-STA Profile subelements when each of the one or more first Per-STA Profile subelements includes a complete profile of the specific STA, and when the type of the first multi-link element indicated by the type field is a probe request, the first multi-link element does not include the STA MAC address field.

10. The method of claim 9, wherein, when the request frame is an association request frame for requesting the ML setup, the association request frame includes the first multi-link element of the basic type.

11. The method of claim 10, wherein, when the response frame is an association response frame corresponding to a response to the association request frame, the association response frame includes a second multi-link element including a type field indicating a type of the second multi-link element included in the association response frame, when the type of the second multi-link element included in the association response frame indicated by the type field is the basic type, the second multi-link element included in the association response frame includes one or more second Per-STA Profile subelements associated with each of one or more APs among the two or more APs, excluding an AP that transmitted the association response frame, and each of the one or more second Per-STA Profile subelements included in the second multi-link element of the association response frame includes a STA MAC address field indicating a MAC address of a specific AP corresponding to each of the one or more second Per-STA Profile subelements when each of the one or more second Per-STA Profile subelements includes a complete profile of the specific AP.

12. The method of claim 9, wherein the response frame comprises a neighbor AP information field corresponding to information on an AP other than an AP having transmitted the response frame, among the two or more APs included in the AP MLD, and wherein octets after a specific octet of a target beacon transmission time (TBTT) information field included in the neighbor AP information field are not processed according to a type of the STA.

13. The method of claim 12, wherein, when the STA is an extremely high throughput (EHT) STA, the octets after the specific octet are processed, and wherein, when the STA is a high efficiency (HE) STA, the octets after the specific octet are not processed.

14. The method of claim 12, wherein the specific octet is a $13^{th}$ octet.

15. The method of claim 12, wherein the neighbor AP information field comprises a length field indicating a length of the TBTT information field included in the neighbor AP information field, and wherein one or more fields included in the TBTT information field included in the neighbor AP information field are identified on the basis of a value of the length field.

16. The method of claim 9, wherein a common information field included in the first multi-link element does not include an MLD MAC address field specifying a MAC address of the MLD when the type of the first multi-link element indicated by the type field is a probe request.

* * * * *